United States Patent
Schauer et al.

(10) Patent No.: US 11,434,581 B2
(45) Date of Patent: Sep. 6, 2022

(54) CARBON NANOTUBE STRUCTURES AND METHODS FOR PRODUCTION THEREOF

(71) Applicant: Nanocomp Technologies, Inc., Merrimack, NH (US)

(72) Inventors: Mark W. Schauer, Dublin, NH (US); Erick C. Towle, Concord, NH (US); Rachel Stephenson, Manchester, NH (US)

(73) Assignee: Nanocomp Technologies, Inc., The Woodlands, TX (US)

(*) Notice: Subject to any disclaimer, the term of this patent is extended or adjusted under 35 U.S.C. 154(b) by 425 days.

(21) Appl. No.: 15/014,579

(22) Filed: Feb. 3, 2016

(65) Prior Publication Data
US 2016/0222536 A1 Aug. 4, 2016

Related U.S. Application Data

(60) Provisional application No. 62/111,290, filed on Feb. 3, 2015.

(51) Int. Cl.
*C25F 7/00* (2006.01)
*C25F 1/00* (2006.01)
*C01B 32/17* (2017.01)

(52) U.S. Cl.
CPC ............... *C25F 7/00* (2013.01); *C01B 32/17* (2017.08); *C25F 1/00* (2013.01)

(58) Field of Classification Search
CPC ... C01B 32/17; C25F 1/00; C25F 7/00; B82Y 40/00; Y10S 977/734–752
See application file for complete search history.

(56) References Cited

U.S. PATENT DOCUMENTS

| | | |
|---|---|---|
| 2,962,386 A | 11/1960 | Doll et al. |
| 3,090,876 A | 5/1963 | Hutson |
| 3,109,712 A | 11/1963 | Redfern |
| 3,462,289 A | 8/1969 | Rohl et al. |
| 3,693,851 A | 9/1972 | Yazawa |
| 3,706,193 A | 12/1972 | Amato |
| 3,943,689 A | 3/1976 | Kunz et al. |
| 3,983,202 A | 9/1976 | Skoroszewski |
| 4,384,944 A | 5/1983 | Silver et al. |
| 4,468,922 A | 9/1984 | McGrady et al. |
| 4,572,813 A | 2/1986 | Arakawa |
| 4,583,247 A | 4/1986 | Fingerhut et al. |

(Continued)

FOREIGN PATENT DOCUMENTS

| | | |
|---|---|---|
| CN | 1614772 | 5/2005 |
| CN | 101451273 | 6/2009 |

(Continued)

OTHER PUBLICATIONS

Ye et al, "Electrochemical Modification of Vertically Aligned Carbon Nanotube Arrays," J. Phys. Chem. B 2006, 110, 12938-12942 (Year: 2006).*

(Continued)

*Primary Examiner* — Salil Jain
(74) *Attorney, Agent, or Firm* — Nanocomp Technologies, Inc.; Robert Diaz

(57) ABSTRACT

A method and system for substantially reducing iron and organic impurities in carbon nanotube materials.

15 Claims, 8 Drawing Sheets

(56) References Cited

U.S. PATENT DOCUMENTS

| | | |
|---|---|---|
| 4,987,274 A | 1/1991 | Miller et al. |
| 5,168,004 A | 12/1992 | Daumit et al. |
| 5,428,884 A | 7/1995 | Tsuzuki |
| 5,488,752 A | 2/1996 | Randolph |
| 5,648,027 A | 7/1997 | Tajiri et al. |
| 5,747,161 A | 5/1998 | Iijima |
| 5,874,159 A | 2/1999 | Cruise et al. |
| 6,036,774 A | 3/2000 | Lieber et al. |
| 6,043,468 A | 3/2000 | Toya et al. |
| 6,110,590 A | 8/2000 | Zarkoob et al. |
| 6,143,412 A | 11/2000 | Schueller et al. |
| 6,265,466 B1 | 7/2001 | Glatkowski et al. |
| 6,299,812 B1 | 10/2001 | Newman et al. |
| 6,308,509 B1 | 10/2001 | Scardino et al. |
| 6,331,265 B1 | 12/2001 | Dupire et al. |
| 6,333,016 B1 | 12/2001 | Resasco et al. |
| 6,426,134 B1 | 7/2002 | Lavin et al. |
| 6,452,085 B2 | 9/2002 | Tauchi et al. |
| 6,495,116 B1 | 12/2002 | Herman |
| 6,541,744 B2 | 4/2003 | VonArx et al. |
| 6,611,039 B2 | 8/2003 | Anthony et al. |
| 6,630,772 B1 | 10/2003 | Bower et al. |
| 6,682,677 B2 | 1/2004 | Lobovsky et al. |
| 6,703,104 B1 | 3/2004 | Neal |
| 6,706,402 B2 | 3/2004 | Rueckes et al. |
| 6,713,034 B2 | 3/2004 | Nakamura et al. |
| 6,723,299 B1 | 4/2004 | Chen et al. |
| 6,736,971 B2 | 5/2004 | Sale et al. |
| 6,764,628 B2 | 7/2004 | Lobovsky et al. |
| 6,764,874 B1 | 7/2004 | Zhang et al. |
| 6,790,426 B1 | 9/2004 | Ohsaki |
| 6,841,139 B2 | 1/2005 | Margrave et al. |
| 6,842,328 B2 | 1/2005 | Schott et al. |
| 6,854,602 B2 | 2/2005 | Oyama et al. |
| 6,884,861 B2 | 4/2005 | Keller et al. |
| 6,908,572 B1 | 6/2005 | Derbyshire et al. |
| 6,923,946 B2 | 8/2005 | Geohegan et al. |
| 6,955,937 B1 | 10/2005 | Burke et al. |
| 6,979,709 B2 | 12/2005 | Smalley et al. |
| 7,001,556 B1 | 2/2006 | Shambaugh |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,109,581 B2 | 9/2006 | Dangelo |
| 7,122,165 B2 | 10/2006 | Wong et al. |
| 7,182,929 B1 | 2/2007 | Singhal et al. |
| 7,192,642 B2 | 3/2007 | Veedu et al. |
| 7,205,069 B2 | 4/2007 | Smalley et al. |
| 7,247,290 B2 | 7/2007 | Lobovsky et al. |
| 7,288,238 B2 | 10/2007 | Smalley et al. |
| 7,323,157 B2 | 1/2008 | Kinloch et al. |
| 7,413,474 B2 | 8/2008 | Liu et al. |
| 7,437,938 B2 | 10/2008 | Chakraborty |
| 7,491,883 B2 | 2/2009 | Lee et al. |
| 7,553,472 B2 | 6/2009 | Mouli et al. |
| 7,611,579 B2 | 11/2009 | Lashmore et al. |
| 7,615,097 B2 | 11/2009 | McKechnie et al. |
| 7,615,204 B2 | 11/2009 | Ajayan et al. |
| 7,641,829 B2 | 1/2010 | Liang et al. |
| 7,666,911 B2 | 2/2010 | Russell et al. |
| 7,670,970 B2 | 3/2010 | Ko |
| 7,704,480 B2 | 4/2010 | Jiang et al. |
| 7,727,504 B2 | 6/2010 | Kittrell et al. |
| 7,745,810 B2 | 6/2010 | Rueckes et al. |
| 7,750,240 B2 | 7/2010 | Jiang et al. |
| 7,846,414 B2 | 12/2010 | Harbec et al. |
| 7,892,677 B2 | 2/2011 | Shirane et al. |
| 7,897,248 B2 | 3/2011 | Barrera et al. |
| 7,906,208 B2 | 3/2011 | Poulin et al. |
| 7,938,996 B2 | 5/2011 | Baughman et al. |
| 8,017,272 B2 | 9/2011 | Feng et al. |
| 8,053,113 B2 | 11/2011 | Oh et al. |
| 8,071,906 B2 | 12/2011 | Smiljanic et al. |
| 8,246,886 B2 | 8/2012 | Lashmore et al. |
| 8,586,458 B2 | 11/2013 | Yoon et al. |
| 8,853,540 B2 | 10/2014 | Adriaenssens |
| 2001/0003576 A1 | 6/2001 | Klett et al. |
| 2002/0004028 A1 | 1/2002 | Margrave et al. |
| 2002/0040900 A1 | 4/2002 | Arx et al. |
| 2002/0065386 A1* | 5/2002 | Sue .................. C07C 39/17 528/97 |
| 2002/0113335 A1 | 8/2002 | Lobovsky et al. |
| 2002/0130610 A1 | 9/2002 | Gimzewski et al. |
| 2002/0136681 A1 | 9/2002 | Smalley et al. |
| 2002/0159943 A1 | 10/2002 | Smalley et al. |
| 2002/0179564 A1 | 12/2002 | Geohegan et al. |
| 2003/0036877 A1 | 2/2003 | Schietinger |
| 2003/0104156 A1 | 6/2003 | Osada et al. |
| 2003/0109619 A1 | 6/2003 | Keller et al. |
| 2003/0122111 A1 | 7/2003 | Glatkowski |
| 2003/0133865 A1 | 7/2003 | Smalley et al. |
| 2003/0134916 A1 | 7/2003 | Hrubesh |
| 2003/0143453 A1 | 7/2003 | Ren et al. |
| 2003/0165648 A1 | 9/2003 | Lobovsky et al. |
| 2003/0222015 A1 | 12/2003 | Oyama et al. |
| 2004/0020681 A1 | 2/2004 | Hjortstam et al. |
| 2004/0022981 A1 | 2/2004 | Hu et al. |
| 2004/0041154 A1 | 3/2004 | Watanabe et al. |
| 2004/0053780 A1 | 3/2004 | Jiang et al. |
| 2004/0065559 A1 | 4/2004 | Iijima et al. |
| 2004/0081758 A1 | 4/2004 | Mauthner et al. |
| 2004/0096389 A1 | 5/2004 | Lobovsky et al. |
| 2004/0124772 A1 | 7/2004 | Chen |
| 2004/0150312 A1 | 8/2004 | McElrath et al. |
| 2004/0177451 A1 | 9/2004 | Poulin et al. |
| 2004/0197638 A1 | 10/2004 | McElrath et al. |
| 2004/0240144 A1 | 12/2004 | Schott et al. |
| 2004/0265212 A1 | 12/2004 | Varadan et al. |
| 2004/0265489 A1 | 12/2004 | Dubin |
| 2004/0266065 A1 | 12/2004 | Zhang et al. |
| 2005/0006801 A1 | 1/2005 | Kinloch et al. |
| 2005/0046017 A1 | 3/2005 | Dangelo |
| 2005/0063658 A1 | 3/2005 | Crowley |
| 2005/0067406 A1 | 3/2005 | Rjarajan et al. |
| 2005/0074569 A1 | 4/2005 | Lobovsky et al. |
| 2005/0087222 A1 | 4/2005 | Muller-Werth |
| 2005/0087726 A1 | 4/2005 | Anazawa et al. |
| 2005/0095938 A1 | 5/2005 | Rosenberger et al. |
| 2005/0104258 A1 | 5/2005 | Lenhoff |
| 2005/0112051 A1 | 5/2005 | Liu et al. |
| 2005/0124246 A1 | 6/2005 | Ko |
| 2005/0170089 A1 | 8/2005 | Lashmore et al. |
| 2005/0179594 A1 | 8/2005 | Morikawa et al. |
| 2005/0209392 A1 | 9/2005 | Luo et al. |
| 2005/0239948 A1 | 10/2005 | Haik et al. |
| 2005/0269726 A1 | 12/2005 | Matabayas, Jr. |
| 2006/0017191 A1 | 1/2006 | Liang et al. |
| 2006/0118158 A1 | 6/2006 | Zhang et al. |
| 2006/0189822 A1 | 8/2006 | Yoon et al. |
| 2006/0234576 A1 | 10/2006 | Smith et al. |
| 2006/0252853 A1 | 11/2006 | Ajayan et al. |
| 2006/0269670 A1 | 11/2006 | Lashmore et al. |
| 2006/0272701 A1 | 12/2006 | Ajayan et al. |
| 2007/0009421 A1 | 1/2007 | Kittrell et al. |
| 2007/0029291 A1 | 2/2007 | Boulos et al. |
| 2007/0031662 A1 | 2/2007 | Devaux et al. |
| 2007/0036709 A1 | 2/2007 | Lashmore et al. |
| 2007/0048211 A1 | 3/2007 | Jiang et al. |
| 2007/0056855 A1 | 3/2007 | Lo et al. |
| 2007/0087121 A1 | 4/2007 | Chang et al. |
| 2007/0092431 A1 | 4/2007 | Resasco et al. |
| 2007/0104947 A1 | 5/2007 | Shambaugh |
| 2007/0104993 A1 | 5/2007 | Lee et al. |
| 2007/0116627 A1 | 5/2007 | Collier et al. |
| 2007/0116631 A1 | 5/2007 | Li et al. |
| 2007/0140947 A1 | 6/2007 | Schneider et al. |
| 2007/0151744 A1 | 7/2007 | Chen |
| 2007/0166223 A1 | 7/2007 | Jiang et al. |
| 2007/0202403 A1 | 8/2007 | Oh et al. |
| 2007/0232699 A1 | 10/2007 | Russell et al. |
| 2007/0236328 A1 | 10/2007 | Bertin et al. |
| 2007/0237959 A1 | 10/2007 | Lemaire |
| 2007/0277866 A1 | 12/2007 | Sander et al. |

(56) References Cited

U.S. PATENT DOCUMENTS

| | | |
|---|---|---|
| 2007/0293086 A1 | 12/2007 | Liu et al. |
| 2008/0001284 A1 | 1/2008 | Yuen et al. |
| 2008/0026116 A1 | 1/2008 | Chisolm et al. |
| 2008/0160865 A1 | 7/2008 | Wei et al. |
| 2008/0166563 A1 | 7/2008 | Brittingham et al. |
| 2008/0170982 A1 | 7/2008 | Zhang et al. |
| 2008/0238882 A1 | 10/2008 | Sivarajan et al. |
| 2008/0261116 A1 | 10/2008 | Burton et al. |
| 2008/0296683 A1 | 12/2008 | Yoon et al. |
| 2009/0042455 A1 | 2/2009 | Mann et al. |
| 2009/0044848 A1 | 2/2009 | Lashmore et al. |
| 2009/0047513 A1 | 2/2009 | Lashmore |
| 2009/0075545 A1* | 3/2009 | Braden et al. .......... B29C 55/00 442/329 |
| 2009/0101505 A1 | 4/2009 | Marino et al. |
| 2009/0117025 A1 | 5/2009 | Lashmore et al. |
| 2009/0127712 A1 | 5/2009 | Wyland |
| 2009/0169819 A1 | 7/2009 | Drzaic et al. |
| 2009/0194525 A1 | 8/2009 | Lee et al. |
| 2009/0214816 A1 | 8/2009 | Hata et al. |
| 2009/0237886 A1 | 9/2009 | Iwai et al. |
| 2009/0246408 A1 | 10/2009 | Chan et al. |
| 2009/0266477 A1 | 10/2009 | Weisenberger |
| 2009/0269511 A1 | 10/2009 | Zhamu et al. |
| 2009/0277897 A1 | 11/2009 | Lashmore et al. |
| 2009/0305135 A1 | 12/2009 | Shi et al. |
| 2009/0311166 A1 | 12/2009 | Hart et al. |
| 2009/0317710 A1 | 12/2009 | Douglas et al. |
| 2010/0021682 A1 | 1/2010 | Liang et al. |
| 2010/0041297 A1 | 2/2010 | Jiang et al. |
| 2010/0044074 A1 | 2/2010 | Kim et al. |
| 2010/0124646 A1* | 5/2010 | Jiang .................... B82Y 30/00 428/220 |
| 2010/0000754 A1 | 7/2010 | Mann et al. |
| 2010/0018395 A1 | 7/2010 | Dai |
| 2010/0196249 A1 | 8/2010 | Hata et al. |
| 2010/0219383 A1 | 9/2010 | Eklund |
| 2010/0220074 A1 | 9/2010 | Irvin, Jr. et al. |
| 2010/0243227 A1 | 9/2010 | Wu et al. |
| 2010/0243295 A1 | 9/2010 | Allemand et al. |
| 2010/0252184 A1 | 10/2010 | Morimoto et al. |
| 2010/0261821 A1 | 10/2010 | Park et al. |
| 2010/0270058 A1 | 10/2010 | Mahoney et al. |
| 2010/0271253 A1 | 10/2010 | Shah et al. |
| 2010/0296983 A1 | 11/2010 | Shiraki et al. |
| 2010/0324656 A1 | 12/2010 | Lashmore et al. |
| 2010/0328845 A1 | 12/2010 | Hiralal et al. |
| 2011/0005808 A1 | 1/2011 | White et al. |
| 2011/0007477 A1 | 1/2011 | Xu et al. |
| 2011/0027491 A1 | 2/2011 | Rueckes et al. |
| 2011/0110843 A1* | 5/2011 | Pasquali ............ B29C 47/0014 423/447.2 |
| 2011/0111279 A1 | 5/2011 | Smithyman et al. |
| 2011/0224113 A1 | 9/2011 | Pick et al. |
| 2012/0045385 A1 | 2/2012 | Lashmore et al. |
| 2012/0085970 A1* | 4/2012 | Zhang ................ B29C 45/0005 252/182.32 |
| 2012/0118552 A1 | 5/2012 | White et al. |
| 2012/0171411 A1* | 7/2012 | Lashmore ............... B32B 5/022 428/114 |
| 2012/0183770 A1 | 7/2012 | Bosnyak et al. |
| 2013/0105195 A1 | 5/2013 | Adriaenssens |
| 2013/0189565 A1* | 7/2013 | Lashmore ............. H01M 4/366 429/163 |
| 2014/0311921 A1 | 10/2014 | Howard et al. |

FOREIGN PATENT DOCUMENTS

| | | | |
|---|---|---|---|
| CN | 101451273 A | * | 6/2009 |
| CN | 101451273 A | † | 6/2009 |
| CN | 103979526 A | * | 8/2014 |
| DE | 102006014171 | | 9/2007 |
| EP | 1160861 | | 12/2001 |
| EP | 2365117 | | 9/2011 |
| IN | 2013-00515 I4 | * | 11/2014 |
| JP | 1958-072036 | | 5/1983 |
| JP | 8035069 | | 2/1996 |
| JP | H09509779 | | 9/1997 |
| JP | 2000-058228 | | 2/2000 |
| JP | 2002-515847 | | 5/2002 |
| JP | 2003518330 | | 6/2003 |
| JP | 2004253796 | | 9/2004 |
| JP | 2004-315297 | | 11/2004 |
| JP | 2005-502792 | | 1/2005 |
| JP | 2005-075672 | | 3/2005 |
| JP | 2005-116839 | | 4/2005 |
| JP | 2005-281672 | | 10/2005 |
| JP | 2007/009213 | | 1/2007 |
| JP | 2007-103375 | | 4/2007 |
| JP | 2007-182352 | | 7/2007 |
| JP | 2008-055375 | | 3/2008 |
| JP | 2008-523254 | | 7/2008 |
| JP | 2009-242145 | | 10/2009 |
| JP | 2009-252713 | | 10/2009 |
| JP | 2010534772 A | † | 11/2010 |
| JP | 2011-508364 | | 3/2011 |
| KR | 2005-0007886 | | 1/2005 |
| WO | 1998/039250 | | 9/1998 |
| WO | 2001/015710 | | 3/2001 |
| WO | 2002/055769 | | 7/2002 |
| WO | 2003/004741 | | 1/2003 |
| WO | 2003/080905 | | 10/2003 |
| WO | 2006/025393 | | 3/2006 |
| WO | 2006/052039 | | 5/2006 |
| WO | 2006/069007 | | 6/2006 |
| WO | 2006/073460 | | 7/2006 |
| WO | 2006/099156 | | 9/2006 |
| WO | 2006/137893 | | 12/2006 |
| WO | 2007/003879 | | 1/2007 |
| WO | 2007/015710 | | 2/2007 |
| WO | 2007/086878 | | 8/2007 |
| WO | 2007/086909 | | 8/2007 |
| WO | 2007/089118 | | 8/2007 |
| WO | 2008/002071 | | 1/2008 |
| WO | 2008/013508 | | 1/2008 |
| WO | 2008/036068 | | 3/2008 |
| WO | 2008/048286 | | 4/2008 |
| WO | 2009/072478 | | 6/2009 |
| WO | 2009/137722 | | 11/2009 |
| WO | 2009/137725 | | 11/2009 |
| WO | 2009-155267 | | 12/2009 |
| WO | 2011/005964 | | 1/2011 |

OTHER PUBLICATIONS

Fogden, S.; Howard, C. A.; Heenan, R. K.; Skipper, N. T.; Shaffer, M. S. P. "Scalable method for the reductive dissolution, purification, and separation of single-walled carbon nanotubes"; ACS Nano 6, 54, 2012.

Hodge, S. A.; Fogden, S.; Howard, C. A.; Skipper, N. T.; Shaffer, M. S. P.; "Electrochemical processing of discrete single-walled carbon nanotube anions"; ACS Nano, 7, 1769.; 2013.

Hodge, S.A. et al.; "Giant ationic Polyelectrodes generated via electrochemical oxidation of single-walled carbon nanotubes"; Nature Communications, pp. 1-6; Jun. 14, 2013.

Pénicaud, A.; Poulin, P.; Derré, A.; Anglaret, E.; Petit, P.; "Spontaneous dissolution of a single-wall carbon nanotube salt"; Journal of the American Chemical Society, 127, 8; 2004.

Wunderlich, D.; Hauke, F.; Hirsch, A. J. Mater; "Preferred functionalization of metallic and small-diameter single walled carbon nanotubes via reductive alkylation"; Chem. 18, 1493; 2008.

PCT International Search Report and Written Opinion issued in International Application No. PCT/US2016/016362 dated Apr. 7, 2016.

Lagowski; "The Chemistry of Nonaqueous Solvents VB; Acid and Aprotic Solvents"; Academic Press, London; p. 139, Table XIX; 1978.

"Metallurgical & Chemical Engineering", McGraw Publishing Co., vol. 15, No. 5, pp. 258-259, Dec. 15, 1916.

(56) References Cited

OTHER PUBLICATIONS

Andrews, R. et al. "Continuous production of aligned carbon nanotubes: a step closer to commercial realization", Chemical Physics Letters, vol. 303, pp. 467-474, 1999.
Biro, et al., "Direct Synthesis of Multi-Walled and Single Walled Carbon Nanotubes by Spray-Pyrolysis", J. Optoelectronics and Advanced Materials, Sep. 2003; vol. 5, No. 3, pp. 661-666.
Braden et al., "Method to synthesis high volume fraction CNT composites by micro-alignment of carbon nanotubes through chemically assisted mechanical stretching", International Sampe Symposium and Exhibition (Proceedings), Material and Process Innovations: Change our World 2008 Soc. for the Advancement of Material and Process Engineering. International Business Office US, vol. 52, 2008, XP009183898.
Ci et al., "Carbon nanofibers and single-walled nanotubes prepared by the floating catalyst method" Carbon. 39:329-335.
D.S. Bethune et al., "Cobalt-catalyzed growth of carbon nanotubes with single-atomic-layer walls", Letters to Nature, 363: 605-607 (1993).
E.F. Kukovitsky et al., "CVD growth of carbon nanotube films on nickel substrates", Applied Surface Science, 215:201-208 (2003).
Endo, M. et al., "Filamentous Growth of Carbon through Benzene Decomposition", Journal of Crystal Growth, vol. 32, pp. 335-349, 1976.
Endo, Morinobu, Grow carbon fibers in the vapor phase, Chemtech, pp. 568-576, Sep. 1988.
Gou, J.G., "Passage: Nanotube Bucky Papers and Nanocomposites", Ph.D. Disseration, Marburg An Der Lahn, pp. 93-126, Jan. 1, 2002.
Gou, J.G., "Single-Walled Carbon Nanotube Bucky Paper/Epoxy Composites: Molecular Dynamics Simulation and Process Development", PH.D. Dissertation, The Florida State University, 2002, p. 9-126.
Gun-Do Lee et al., "Catalytic decomposition of acetylene on Fe (001): A first-principles study", The American Physical Society, Physical Review B66 081403R: 1-4 (2002).
H.W. Kroto et al., "C60: Buckminsterfullerene", Letters to Nature, 318:162-163, (1985).
H.W. Zhu et al., "Direct Synthesis of Long Single-Walled Carbon Nanotube Strands", Science, 296:884-886 (2002).
Hanson, G. W., "Fundamental Transmitting Properties of Carbon Nanotube Antennas", IEEE Transactions on Antennas and Propagation, vol. 53, No. 11, pp. 3246-3435, Nov. 2005.
Jiang et al., "Spinning Continuous Carbon Nanotube Yarns", Nature, Oct. 24, 2002, vol. 419, p. 801.
Kaili et al., "Spinning Continuous Carbon Nanotube Yarns", Nature, Oct. 24, 2002, vol. 419, p. 801.
Ki-Hong Lee et al., "Control of Growth Orientation for Carbon Nanotubes", Applied Physics Letters, 82(3):448-450, (2003).
Ko et al., "Electrospinning of Continuous Carbon Nanotube-Filled Nanofiber Yarns," Advanced Materials. 15 (14): 1161-1165.
Lagerwall, J. et al., "Simultaneous alignment and dispersion of carbon nanotubes with lyotropic liquid crystals", Physica Status Solidi (PSS), vol. 243, No. 13, pp. 3046-3049, 2006.
Li et al., "Direct Spinning of Carbon Nanotube Fibers from Chemical Vapor Deposition Synthesis", Science Magazine, 2004, vol. 304, pp. 276-278.
Lijie, C., et al., Preperation of carbon nanofibers by floating catalyst method, Carbon, vol. 38, pp. 1933-1397, 2000.
M. Jose-Yacaman et al., "Catalytic growth of carbon microtubules with fullerene structure", Applied Physics Letters, 62 (6): 657-659 (1993).
Malik, Sharali et al.; "Failure mechanism of free standing single-walled carbon nanotube thin films under tensile load"; Phyical Chemistry Chemical Physics; 2004,6, 3540-3544.
Merriam Webster Dictionary Definition of "along", available at http://merriam-webster.com/dictionary/along (retrieved Sep. 16, 2010).

Moisala et al., "Single-walled carbon nanotube synthesis using ferrocene and iron pentacarbonyl in a laminar flow reactor," Chemical Engineering Science, 61(13), pp. 4393-4402 (Jul. 2006).
Moore, V. et al., "Individually Suspended Single-Walled Carbon Nanotubes in Various Surfactants", Nano Letters, vol. 3, pp. 1379-1382, 2003.
N. Seo Kim et al., "Dependence of the Vertically Aligned Growth of Carbon Nanotubes on the Catalysts", The Journal of Physical Chemistry, 106 (36): 9286-9290 (2002).
Ng, Single Walled Carbon Nanotube Paper as anode for lithium-ion battery; Elsevier, Elechtrochimica Acta 51 (2005) 23-28.
Okabe, T. et al., "New Porous Carbon Materials, Woodceramics: Development and Fundamental Properties", Journal of Porous Materials, vol. 2, pp. 207-213, 1996.
Patel, N. et al., "Dispersing Nanotubes with Surfactants: A Microscopic Statistical Mechanical Analysis", Journal of American Chemical Society, vol. 127, pp. 14124-14125, 2005.
Pipes et al., "Helical carbon nanotube arrays: mechanical properties," Composites Science and Technology. 62: 419-428 (2002).
R.T.K. Baker et al., "Nucleation and Growth of Carbon Deposits from the Nickel Catalyzed Decomposition of Acetylene", Journal of Catalysis, 26:51-62 (1972).
Rao, C. et al., "Carbon Nanotubes from Organometallic Primers," Accounts of Chemical Research, vol. 35, No. 12, pp. 998-1007, 2002.
Samulski, E. et al., "Alignment of Nematic Liquid Crystals Using Carbon Nanotube Films", Thin Solid Films, vol. 509, pp. 53-57, 2006.
Schaevitz et al., "A Combustion-Based Mems Thermoelectric Power Generator", The 11th Conference on Solid-State Sensors and Actuators, Munich, Germany, Jun. 10-14, 2001.
Seo et al., "Synthesis and manipulation of carbon nanotubes," New Journal of Phsics. 5: 120.1-120.22 (2003).
Seung-Yup Lee et al., "Synthesis of Carbon Nanotubes Over Gold Nanoparticle Supported Catalysts", Carbon, 43 (2005), pp. 2654-2663.
Shi, X. et al., "Alignment of Carbon Nanotube Additives for Improved Performance of Magnesium Diboride Superconductors", Advanced Materials, vol. 18, pp. 785-788, 2006.
Sinani V. et al., "Aqueous Dispersions of Single-wall and Multiwall Carbon Nanotubes with Designed Ampliplilic Polycations", Journal of American Chemical Society, vol. 127, pp. 3463-3472. 2005.
Sumio Iijima, "Helical microtubules of graphitic carbon", Letters to Nature, 354:56-58 (1991).
Surfynol, Dynol, and Envirogem Reference Guide. AirProducts, 2006 {retrieved fro mthe Internet: <URL: www.airproducts.com/microsite/perfmat/pdf/ZetaSperseAdditives.pdf>.
Tapaszto et al., Diameter and Morphology Dependence on Experimental Conditions of Carbon Nanotube Arrays Grown by Spray Pyrolysis, Carbon, Jan. 2005; vol. 43, pp. 970-977.
Vigolo et al., "Improved structure and properties of single-wall carbon nanotube spun fibers", Applied Physics Letters, American Institute of Physics, US, vol. 81, No. 7, Aug. 12, 2002 (Aug. 12, 2002), pp. 1210-1212, XP012033229.
Wang, "Processing and property investigation of single walled carbon nanotube (SWNT) buckypaper/epoxy resin matrix nanocomposites," Composites. 35(10): 1225-1232 (2004).
Windle, A. et al., "Mechanical Properties of Continuously Spun Fibers of Carbon Nanotubes", Nano Letters, vol. 5, No. 8, 2005.
Xiao et al., "High-Mobility Thin-Film Transitors Based on Aligned Carbon Nanotubes", Applied Physics Letters, vol. 83, No. 1, pp. 150-152, Jul. 7, 2003.
Yurelki K., et al. "Small-Angle Neutron Scattering from Surfactant-Assisted Aqueous Dispersions of Carbon Nanotubes", Journal of Americal Chmical Society, vol. 126, pp. 9902-9903, 2004.
Almeida, et al., "Growth of vertically aligned carbon nanotubes on carbon fiber: thermal and electrochemical treatments." J Solid State Electrochem (2013) 17:1977-1984.†

\* cited by examiner
† cited by third party

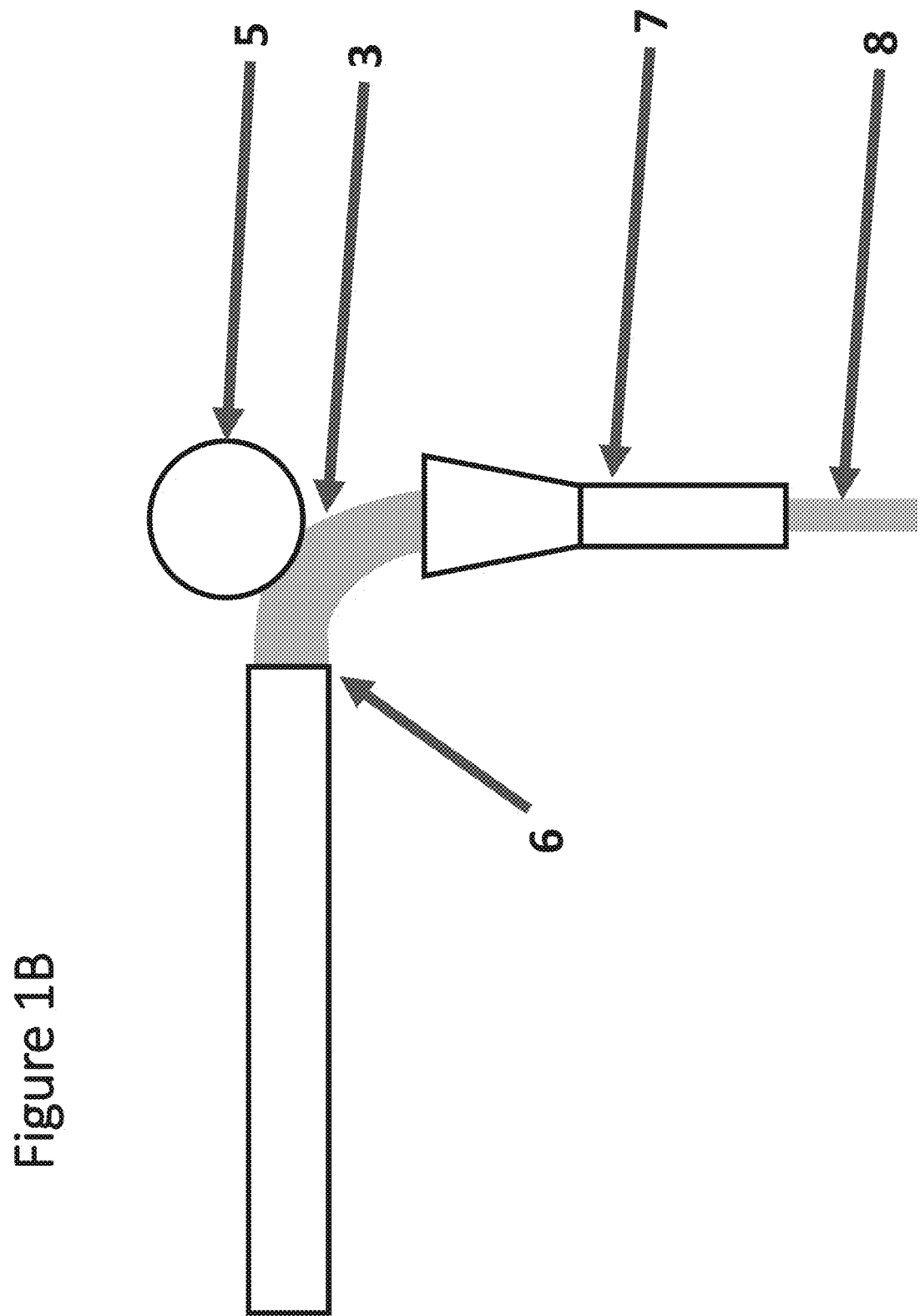

CARBON NANOTUBE STRUCTURES AND METHODS FOR PRODUCTION THEREOF

RELATED APPLICATIONS

This application claims priority to U.S. Provisional Application Ser. No. 62/111,290, filed Feb. 3, 2015, the disclosure of which is hereby incorporated herein by reference in its entirety.

GOVERNMENT SUPPORT

This invention is supported, in whole or in part, by U.S. Government under Contract No. FA8650-11-2-5505. The government has certain rights in the invention.

TECHNICAL FIELD

The present invention relates to nano-material and more particularly to methods for providing carbon nanotube material having high tensile modulus, high strength, and high electrical conductivity.

BACKGROUND ART

Carbon nanotubes are known to have extraordinary tensile strength, including high strain-to-failure and relatively high tensile modulus, as well as good electrical conductivity. Carbon nanotubes may also be highly resistant to fatigue, radiation damage, and heat. To this end, carbon nanotube materials can be used for their tensile strength and electrical conductivity properties.

Due to their high electrical and thermal conductivity, CNT materials are being used in a wide variety of electrical applications, including batteries, capacitors and cables. The high tensile strength and modulus of CNT materials allow them to be used as multi-functional system that integrate electrical applications with structural elements.

SUMMARY OF THE INVENTION

Aspects of the present invention provides a method for treating nanofibrous macrostructure and removing impurities, such as carbonaceous contaminant, hydrocarbon, catalyst, and any combination of the foregoing. In some embodiments, the method of treating can remove iron catalysts.

According to some aspects, the method can comprise providing a nanofibrous macrostructure, the nanofibrous macrostructure being defined by a plurality of nanotubes, exposing the nanotubes within the nanofibrous macrostructure to an anodic electrochemical treatment, and removing impurities from the nanofibrous macrostructure via the anodic electrochemical treatment. In some embodiments, the impurities can be washed away.

In some embodiments, the nanofibrous macrostructure can be defined by a plurality of substantially non-aligned nanotubes and the method further comprises debundling and stretching the nanofibrous macrostructure, so as to substantially re-bundle and align the nanotubes relative to one another within the stretched nanofibrous macrostructure.

In some embodiments, the nanofibrous macrostructure is a non-woven sheet or a yarn. In some embodiments, the nanofibrous macrostructure is buckypaper. In some embodiments, the nanotubes include one of carbon nanotubes, boron nanotubes, boron nitride nanotubes or a combination thereof. For example, the nanotubes can include single wall nanotubes, dual wall nanotubes, multiwall nanotubes, or a combination thereof.

In some embodiments, the nanotubes within the nanofibrous macrostructure are exposed to an anodic electrochemical treatment. In some embodiments, the anodic electrochemical treatment is in an electrical cell, at a positive electro-potential. In some embodiments, the nanofibrous macrostructure are exposed to an anodic electrochemical treatment in presence of an organic electrolyte solution.

In some embodiments, the nanofibrous macrostructure can be recovered and optionally further processed. In some embodiments, the nanofibrous macrostructure can be exposed to an acid and subjected to stretching. In some embodiments, any acid having a value of less than −12 on the Hammett acidity function scale ($H_0$) can be used. In some embodiments, any agent that has a value of less than −12.5 on the Hammett acidity function scale ($H_0$) can be used.

In other embodiments, the nanotubes within the nanofibrous macrostructure can be first subjected to stretching before being exposed to an anodic electrochemical treatment.

In some embodiments, the acid is a super acid. In some embodiments, the super acid can comprise one of chlorosulfonic acid triflic acid, fluorosulfuric acid, fluoroantimonic acid, fuming sulfuric acid, or any combinations of the foregoing.

In some embodiments, the nanofibrous macrostructure can be subjected to post-processing, such as by solution/acid washing, cathodic treatment, further anodic treatment, incorporation of polymer, or any combination thereof.

Some aspects of the invention relate to a method for treating nanofibrous macrostructure, comprising providing a nanofibrous macrostructure, the nanofibrous macrostructure being defined by a plurality of nanotubes, and doping the nanotubes within the nanofibrous macrostructure using an anodic electrochemical treatment. In some embodiments, the resulting nanofibrous macrostructure has improved electrical conductivity properties.

In some embodiments, the nanofibrous macrostructure can be post-processed by solution/acid washing, cathodic treatment, further anodic treatment, incorporation of polymer, or any combination thereof.

Other aspects of the invention relate to a system for treating a nanofibrous macrostructure. In some embodiments, the system comprises an electrochemical cell comprising an electrode, a counter electrode and an electrolyte solution and optionally a separator between the electrode and the counter electrode.

BRIEF DESCRIPTION OF DRAWINGS

FIG. 1B illustrates a schematic of one embodiment of the yarn collection system.

DESCRIPTION OF SPECIFIC EMBODIMENTS

Figure 1A:
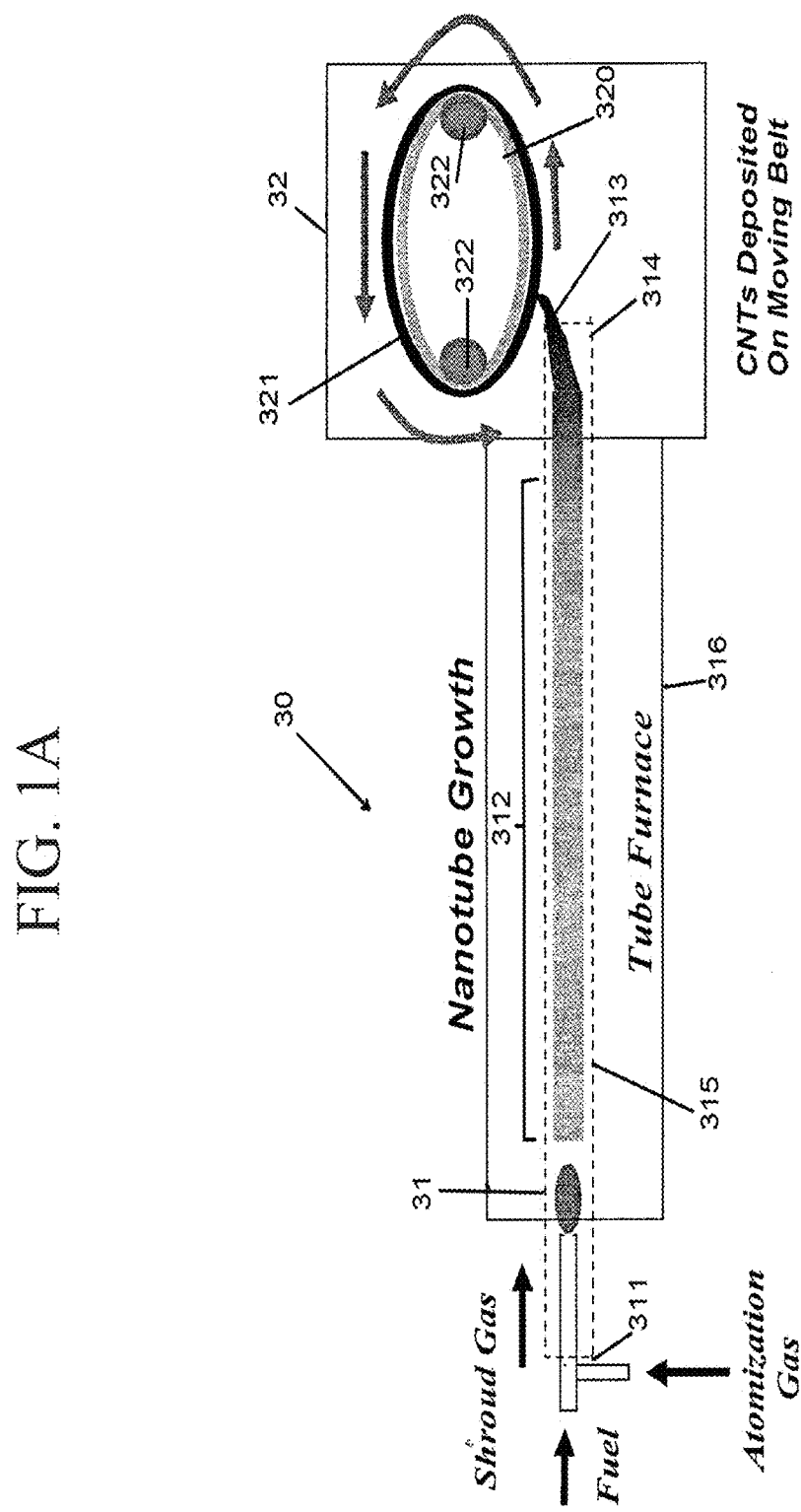
FIG. 1A illustrates a system for generating nanotubes and collecting the nanotubes as a non-woven sheet.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Aspects of the invention are not limited in application to the details of construction and the arrangement of components set forth in the following description or illustrated in the drawings. Aspects of the invention are capable of other embodiments and of being practiced or of being carried out in various ways. In addition, aspects of the invention may be used alone and/or in any suitable combination with any other aspect(s) of the invention.

Any of the embodiments herein referencing carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nanotubes, and carbon nanotubes having heteroatom substitution in the nanotube structure.

Synthesis of Nanotubes

Nanotubes for use in connection with the present invention may be fabricated using a variety of approaches. Presently, there exist multiple processes and variations thereof for growing nanotubes. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation. It should be noted that although reference is made below to nanotubes synthesized from carbon, other compound(s) may be used in connection with the synthesis of nanotubes for use with the present invention. Other methods, such as plasma CVD or the like are also possible. In addition, it is understood that boron nanotubes may also be grown in a similar environment, but with different chemical precursors.

The carbon nanotubes (CNTs) made can be present in a variety of forms including, for example, sheet, yarn, powder, fibers, slurry and buckypaper. Furthermore, the bundled carbon nanotubes may be of any length, diameter, number of walls, or chirality. Yet in some embodiments, the CNTs can have a length greater than about 100 micrometers. For example, the CNTs can have a length greater about 100 micrometers, greater than about 150 micrometers, greater than about 200 micrometers, greater than about 250 micrometers, greater than about 300 micrometers, greater than about 350 micrometers, greater than about 400 micrometers, greater than about 450 micrometers or greater than about 500 micrometers. It should be noted that hereinafter the terms "carbon nanotubes" or "CNTs" can be used interchangeably to refer to carbon nanotubes.

Carbon nanotubes can be made in structures having hierarchical morphologies of increasing complexity. The general structures formed are, but not limited to, CNT sheets, yarns, and powders (e.g. bundles, fibers, or other entities). Such nanofibrous macrostructure can be extendible. As used herein nanofibrous macrostructure, CNTs structure and CNTs material are used interchangeably.

In some aspects, the present invention can employ a chemical vapor deposition (CVD) process or similar gas phase pyrolysis procedures known in the industry to generate the appropriate nanostructures, including nanotubes.

Carbon nanotubes, including single wall (SWNT), double wall (DWNT), and multiwall (MWNT), may be grown, in some embodiments of the present invention, by exposing nanoscaled catalyst particles in the presence of reagent carbon-containing gases (i.e., gaseous carbon source at elevated temperatures). In particular, the nanoscaled catalyst particles may be introduced into a high heat environment along with the reagent carbon-containing gases, either by addition of existing particles or by in situ synthesis of the particles from a metal-organic precursor, or even non-metallic catalysts. Although SWNT, DWNT, and MWNT may be grown, in certain instances, SWNT may be selected due to their relatively higher growth rate and tendency to form rope-like structures, which may offer advantages in handling, thermal conductivity, electronic properties, and strength. Yet in other embodiments, DWNT or Few Walled Nanotubes may be selected for their strength and conductivity.

The strength of the individual nanotubes generated in connection with the present invention may be about 30 GPa or more. Strength, as should be noted, is generally sensitive to defects. However, the elastic modulus of individual carbon nanotubes fabricated in accordance with an embodiment of the present invention may not be sensitive to defects and can be of about 1 TPa. Moreover, the strain to failure, which generally can be a structure sensitive parameter, may range from about 10% to about 25% for carbon nanotubes used in the present invention.

Furthermore, the nanotubes of the present invention can be provided with relatively small diameter. In some embodiment of the present invention, the nanotubes fabricated in the present invention can be provided with a diameter in a range of from about 1 nm to about tens of nm.

In particular, since growth temperatures for CVD can be comparatively low ranging, for instance, from about 400° C. to about 1400° C., carbon nanotubes, both single wall (SWNT), dual wall (DWCNT) or multiwall (MWNT), may be grown. These carbon nanotubes may be grown, in some embodiments, from nanostructural catalyst particles introduced into reagent carbon-containing gases (i.e., gaseous carbon source), either by addition of existing particles or by in situ synthesis of the particles from, for instance, a metal-organic precursor, or even non-metallic catalysts. In some embodiments, the catalyst comprises iron.

According to some aspects of the invention, a free-flowing cloud or loose suspension of nanotubes in a gas phase can be produced by chemical vapor deposition. Nanotubes can self-assemble to form an aggregate. In some embodiments, the CNTs can grow through a progression of forms from small growing nanotubes, to bundles and can gel into a mass. The CNTs in the aggregate can be held together by van der Waals forces. In some embodiments, the nanotubes can be formed in such a manner that the nanotubes can be caused to deposit either on a moving belt or cylinder or rotating anchor.

In some embodiments, when deposited onto a moving belt or spinning cylinder, the nanotubes can consolidate and be matted so as to form a non-woven sheet. Alternatively, when deposited onto a rotating anchor, the nanotubes can be pulled from the anchor and spun into a yarn.

Nanotubes collected as yarns, non-woven sheets, or similar extensible macrostructures can also be fabricated by other means known in the art. For instance, the nanotubes can be dispersed in a water, surfactant solution, or solvent system, then caused to precipitate onto a filter drum or membrane, where they can be subsequently be dried and removed as a buckypaper. In some embodiments, CNTs can be made in some hierarchical morphologies (e.g. sheet), and transform the CNTs into another form (e.g., particulate and/or fiber) using chemical means, physical means or combination of chemical and physical means. For example, chemical compounds can be used to separate CNTs from their higher order morphology (such as CNTs aggregate, CNTs mesh or CNTs macrostructures) into much smaller entities, bundles or even individual tubes. In some embodiments, the chemicals may be used with mild physical agitation to help dissociating the CNTs. Examples of mechanical agitation methods that may be used include without limitation shaking, stirring, and/or other mechanical means. Such an approach is disclosed in U.S. Patent Publication No. US 2014-0366773 (U.S. Ser. No. 14/244,177), which is hereby incorporated herein by reference in its entirety. This material can then be processed using papermaking techniques known in the art into, for example, a macroscopic sheet or buckypaper. Similarly, nanotubes collected as yarns can also be produced from solutions, and using processes known in the art.

With reference now to FIGS. 1A and 1B, there is illustrated a system 30, similar to that disclosed in U.S. Pat. No. 7,993,620 (incorporated herein by reference), for use in the fabrication of nanotubes. System 30, in an embodiment, may include a synthesis chamber 31. The synthesis chamber 31, in general, includes an entrance end 311, into which reaction gases (i.e., gaseous carbon source) may be supplied, a hot zone 312, where synthesis of nanotubes 313 may occur, and an exit end 314 from which the products of the reaction, namely a cloud of nanotubes and exhaust gases, may exit and be collected. The synthesis chamber 31, in an embodiment, may include a quartz tube, a ceramic tube or a FeCrAl tube 315 extending through a furnace 316. The nanotubes generated by system 30, in one embodiment, may be individual nanotubes, bundles of such nanotubes, and/or intermingled or intertwined nanotubes, all of which may be referred to hereinafter as "non-woven."

System 30, in one embodiment of the present invention, may also include a housing 32 designed to be substantially fluid (e.g., gas, air, etc.) tight, so as to minimize the release of potentially hazardous airborne particulates and reaction gasses from within the synthesis chamber 31 into the environment. The housing 32 may also act to prevent oxygen from entering into the system 30 and reaching the synthesis chamber 31. In particular, the presence of oxygen within the synthesis chamber 31 can affect the integrity of the chamber (i.e. explode) and can compromise the production of the nanotubes 313.

System 30 may also include a moving belt 320, positioned within housing 32, designed for collecting synthesized nanotubes 313 generated from within synthesis chamber 31 of system 30. In particular, belt 320 may be used to permit nanotubes collected thereon to subsequently form a substantially continuous extensible structure 321, for instance, a CNT sheet. Such a CNT sheet may be generated from substantially non-aligned, non-woven nanotubes 313, with sufficient structural integrity to be handled as a sheet. Belt 320, in an embodiment, can be designed to translate back and forth in a direction substantially perpendicular to the flow of gas from the exit end 314, so as to increase the width of the CNT sheet 321 being collected on belt 320.

To collect the fabricated nanotubes 313, belt 320 may be positioned adjacent the exit end 314 of the synthesis chamber 31 to permit the nanotubes to be deposited on to belt 320. In one embodiment, belt 320 may be positioned substantially parallel to the flow of gas from the exit end 314, as illustrated in FIG. 1A. Alternatively, belt 320 may be positioned substantially perpendicular to the flow of gas from the exit end 314 and may be porous in nature to allow the flow of gas carrying the nanomaterials to pass through the belt. In one embodiment, belt 320 can be designed to translate from side to side in a direction substantially perpendicular to the flow of gas from the exit end 314, so as to generate a sheet that is substantially wider than the exit end 314. Belt 320 may also be designed as a continuous loop, similar to a conventional conveyor belt, such that belt 320 can continuously rotate about an axis, whereby multiple substantially distinct layers of CNT can be deposited on belt 320 to form a sheet 321. To that end, belt 320, in an embodiment, may be looped about opposing rotating elements 322 and may be driven by a mechanical device, such as an electric motor. In one embodiment, the mechanical device may be controlled through the use of a control system, such as a computer or microprocessor, so that tension and velocity can be optimized. The deposition of multiple layers of CNT in formation of sheet 321, in accordance with one embodiment of the present invention, can result in minimizing interlayer contacts between nanotubes. Specifically, nanotubes in each distinct layer of sheet 321 tend not to extend into an adjacent layer of sheet 321. As a result, normal-to-plane thermal conductivity can be minimized through sheet 321.

To disengage the CNT sheet 321 of intermingled non-woven nanomaterials from belt 320 for subsequent removal from housing 32, a blade (not shown) may be provided adjacent the roller with its edge against surface of belt 320. In this manner, as CNT sheet 321 is rotated on belt 320 past the roller, the blade may act to lift the CNT sheet 321 from surface of belt 320. In an alternate embodiment, a blade does not have to be in use to remove the CNT sheet 321. Rather, removal of the CNT sheet may be by hand or by other known methods in the art.

Additionally, a spool (not shown) may be provided downstream of blade, so that the disengaged CNT sheet 321 may subsequently be directed thereonto and wound about the spool for harvesting. As the CNT sheet 321 is wound about the spool, a plurality of layers of CNT sheet 321 may be formed. Of course, other mechanisms may be used, so long as the CNT sheet 321 can be collected for removal from the housing 32 thereafter. The spool, like belt 320, may be driven, in an embodiment, by a mechanical device, such as an electric motor, so that its axis of rotation may be substantially transverse to the direction of movement of the CNT sheet 321.

In order to minimize bonding of the CNT sheet 321 to itself as it is being wound about the spool, a separation material may be applied onto one side of the CNT sheet 321 prior to the sheet being wound about the spool. The separation material for use in connection with the present invention may be one of various commercially available metal sheets or polymers that can be supplied in a continuous roll. To that end, the separation material may be pulled along with the CNT sheet 321 onto the spool as sheet is being wound about the spool. It should be noted that the polymer comprising the separation material may be provided in a sheet, liquid, or any other form, so long as it can be applied to one side of CNT sheet 321. Moreover, since the intermingled nanotubes within the CNT sheet 321 may contain catalytic nanoparticles of a ferromagnetic material, such as Fe, Co, Ni, etc., the separation material, in one embodiment, may be a non-magnetic material, e.g., conducting or otherwise, so as to prevent the CNT sheet from sticking strongly to the separation material. In an alternate embodiment, a separation material may not be necessary.

After the CNT sheet 321 is generated, it may be left as a CNT sheet or it may be cut into smaller segments, such as strips. In an embodiment, a laser may be used to cut the CNT sheet 321 into strips as the belt 320 or drum rotates and/or simultaneously translates. The laser beam may, in an embodiment, be situated adjacent the housing 32 such that the laser may be directed at the CNT sheet 321 as it exits the housing 32. A computer or program may be employed to control the operation of the laser beam and also the cutting of the strip. In an alternative embodiment, any mechanical means or other means known in the art may be used to cut the CNT sheet 321 into strips.

Alternatively, in another embodiment, instead of a belt, a rigid cylinder, such as a drum can be positioned to rotate about an axis, whereby multiple substantially distinct layers of CNTs from a cloud of CNTs can be deposited on drum to form a sheet.

A system suitable for use in accordance with the present invention is shown in FIG. 1A. The CNTs material produced by such system can be collected as a non-woven sheet on a moving belt 320, as shown in FIG. 1A, or a drum, or can be collected as a yarn on a spindle. Such production method can provide, in a CNT sheet or yarn which can be subsequently used in various applications. The carbon nanotubes, in some embodiments, can be deposited in multiple distinct layers to form a multilayered structure or morphology in a single CNT sheet. In some embodiments, the CNT sheet can have a low normal-to-plane or through-thickness thermal conductivity, which may result from inter-layer and/or inter-tube resistance.

A system similar to system 30 may also be used for manufacturing nanotube yarns. To manufacture yarns, housing 32 can be replaced with an apparatus to receive nanotubes from the furnace 316 and spin them into yarns. The apparatus may include a rotating spindle that may collect nanotubes as they exit tube 315. The rotating spindle may include an intake end into which a plurality of tubes may enter and be spun into a yarn. The direction of spin may be substantially transverse to the direction of movement of the nanotubes through tube 315. Rotating spindle may also include a pathway along which the yarn may be guided toward an outlet end of the spindle. The yarn may then be collected on a spool.

Although not shown, it should be appreciated that the nanotubes generated may also be collected as a yarn. Such an approach is disclosed in U.S. Pat. No. 7,993,620, which is hereby incorporated herein by reference in its entirety. The method for making yarn can include receiving a plurality of synthesized nanotubes moving substantially in one direction in an airtight environment. Prior to receiving, a vortex flow may be imparted on to the nanotubes so as to provide an initial twisting. Next, the nanotubes may be twisted together into a yarn in a direction substantially transverse to the direction of movement of the nanotubes. Thereafter, the yarn may be moved toward an area for harvesting and subsequently harvested by winding the yarn about an axis substantially transverse to a direction of movement of the yarn.

In some embodiments, a rotating spindle may be designed to extend from within housing, through inlet, and into synthesis chamber for collection of extended length nanotubes. In an embodiment, rotating spindle may include an intake end into which a plurality of nanotubes may enter and be spun into a yarn. In an embodiment, the direction of spin may be substantially transverse to the direction of movement of the nanotubes. Rotating spindle may also include a pathway, such as hollow core, along which yarn may be guided toward outlet end of spindle. The system can further include a guide arm which may be coupled to the outlet end of rotating spindle to guide and direct yarn toward a spool for gathering thereon.

Referring to FIG. 1B, there is illustrated a system for collecting fibrous structures or materials, such as yarn, from the flow of nanotubes. Referring to FIG. 1B, the cloud of nanotubes (or roving, 3) exits from the CVD furnace or material conveyor 6. As it exists, the flow of nanotubes can be redirected by an anchor or rotating feed pulley 5 situated adjacent to the exit end of the furnace 6 toward a rotating collection tube 7. Once within the collection tube 7, the flow of nanotubes can be directed and pulled as it goes through tube 7. In some embodiments, the material can be collected as a loose tow or roving and subsequently formed into a wire, yarn, tape, etc. (see U.S. application U.S. Ser. No. 14/952,427, filed Nov. 25, 2015, entitled "Hierarchically Structured Carbon Nanotube Materials and Methods For Production Thereof", which is incorporated herein in its entirety).

It should be noted that the CNTs within the CNTs material may contain catalytic nanoparticles of a ferromagnetic material, such as Fe, Co, Ni, etc. . . .

It should be noted that the properties of carbon nanotubes (CNTs) or carbon nanotubes structures can be governed by structural properties of the carbon nanotubes, such as defects, length, diameter and chirality, and overall tube-bundle alignment and/or interactions. In some embodiments, alignment of CNT structures can be accomplished after fabrication.

Post-Synthesis Processing

Aspects of the invention are directed to methods for the reduction of catalyst particles, such as iron, and organic impurities in the CNTs structures or materials. Other aspects of the invention are directed to CNT materials substantially free of catalyst particles and/or organic impurities. According to some aspects of the invention, the CNT material has enhanced electrical properties. In various embodiments, materials made from nanotubes of the present invention can present significant advantages, such as strength, thermal conductivity, current capacity, and high frequency performance over certain metallic conducting members, such as stainless steel, as such materials are electrical conductors.

In some aspects of the invention, the method comprises subjecting the CNTs material to an anodic electrochemical process. In some embodiments, the process can take place is an electrochemical cell.

In some aspects of the invention, the method allows for the purification, exfoliation, stretching, alignment and a combination thereof of the material without damaging the CNTs. In some embodiments, the electrochemical treatment can be used without a super acid treatment or in conjunction with a treatment with super acids. The methods provided herein provide a simple, non-damaging means to purify CNTs material without adversely affecting properties, such as strength and electrical conductivity.

In some embodiments, the methods described herein can be easily automated and are amenable to mass production. It should be noted that the methods described herein involve mild conditions (e.g., ambient temperatures vs. 300-800° C. for gas phase purifications), a simple setup, virtually one-step and continuous operation.

Due to the presence of catalysts during the growth and fabrication process, the nanotubes within these yarns, tapes or sheets may include catalysts (i.e., iron) and carbonaceous matter (i.e., amorphous and graphitic carbon). For example, the CNTs in the carbon nanotube material can contain from about 10% to about 30% by weight of iron. The CNTs in the carbon nanotube material can contain from about 5% to about 25% by weight of hydrocarbon and non-CNT carbonaceous material. Therefore, the purification of CNTs from contaminants may be substantially more time consuming and expensive than the actual production of the carbon nanotubes.

These impurities can add weight and can negatively impact certain physical and mechanical properties, such as strength and electrical conductivity. For many applications, controlling the purity of the CNTs is essential to impart the desired physical and mechanical properties to the CNT structures or CNT materials. Since certain physical, chemical and mechanical properties of the CNT structures can be dependent on purity, the presence of contaminants in the CNT structures can affect the properties of these structures. Macro-properties such as strength, electrical and thermal conductivity, electrochemical properties, the thermoelectric Seebeck coefficient and others are not only related to the properties of the individual tubes or bundles, but also critically to their purity, and/or interaction on the nanoscale. Other properties which may be affected include complex index of refraction, frequency dependency of resistivity, and chemical reactivity.

In some embodiments, iron as well as hydrocarbon and non-CNT carbonaceous impurities can be present in unpurified CNT material as a result of iron being used in the synthesis of such CNTs. The presence of iron and/or other catalysts can be detrimental to some applications such as, but not limited to, battery electrodes, and wiring for magnetic resonance imaging machine.

The hydrocarbon and carbonaceous impurities coating the CNTs can prevent close contact between the CNTs. This barrier to contact can reduce the electrical contact between tubes, thus reducing the electrical conductivity of the CNT structures.

Therefore, aspects of the invention are directed to methods of producing CNT materials which enable synthesis of commercial quantities of substantially pure CNT materials.

Removing the iron and/or other catalysts from the CNT material can be difficult to accomplish without damaging the CNTs, iron catalysts at growth temperature in the furnace may be saturated with carbon. Upon cooling, excess carbon can precipitate onto the surface of the iron catalysts, resulting in several layers of graphene. Graphene layers can be seen in transmission electron microscopy (TEM) which is used to characterize qualitatively the CNTs produced. The graphene coating can prevent the simple dissolution of the iron in acidic solution. The iron can be effectively removed from the CNT material by heating it in air for about an hour to temperatures of about 300° C. to 500° C., or superior to about 300° C., followed by washing in an acidic solution. However, one of skill in the art will appreciate that the heat treatment can damage the CNTs thereby reducing the strength and electrical conductivity of the material. Heating above 300° C. in air can vaporize some non-CNT carbonaceous contaminants. However, one of skill in the art will appreciate that the temperature at which the non-CNT carbonaceous contaminants burn can affect the integrity of the CNTs. These aggressive processes typically result in severe damage to, and loss of, CNTs that can outweigh any benefits. Additionally, these methods are often limited to small batch yields, low yields, and/or low purity. Consequently, an efficient industrial scale purification process to remove these impurities is essential, as many of the applications of CNTs require highly-purified CNTs.

In some aspects of the invention, the CNTs are submitted to an electrochemical treatment at positive (i.e. anodic electrochemical treatment) potential to release the graphene layers. In some embodiments, the electrochemical treatment is performed at room temperature. Release of the graphene layers allows for the iron to be exposed and oxidized (e.g. $Fe^{2+}$, $Fe^{3+}$) and be readily dissolved into solution. In some embodiments, anodic electrochemical treatment results in a CNT material having less than about 5%, less than about 4%, less than about 3%, less than about 2%, less than about 1% by weight of iron. In some embodiments, anodic electrochemical treatment results in a CNT material that is substantially free of iron.

In some embodiments, anodic electrochemical treatment can cause many contaminants to be displaced from the CNTs through electrostatic forces. In some embodiments, the anodic electrochemical treatment of the CNT material can result in a CNT material that is substantially free of contaminants such as, but not limited to, iron and non-CNT carbonaceous contaminants (see FIG. 2A-2B).

In some embodiments, anodic electrochemical treatment can allow for the exfoliation and expansion of the CNTs material. In some embodiments, treatment can be done under tension such that stretching and alignment of the material can occur.

In some embodiments, the CNT material can be first stretched and the stretched CNT material can be subjected to anodic electrochemical treatment. CNT material can be stretched with using any appropriate process known in the art.

Figure 3A:
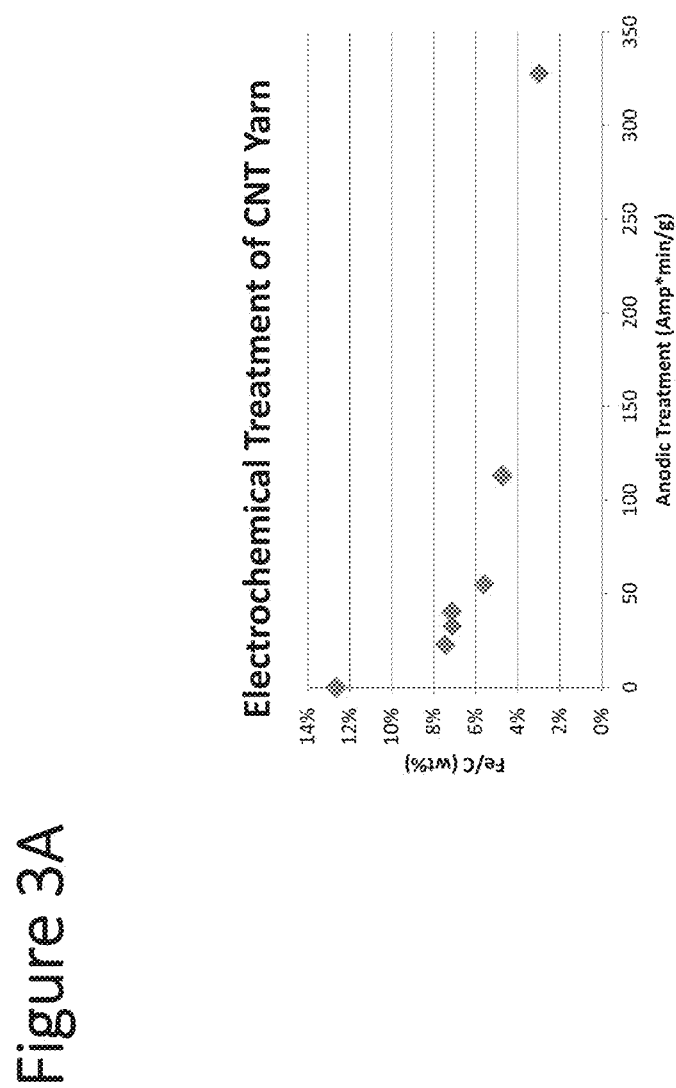
FIG. 3A illustrates iron content by EDX relative to carbon content in weight percent as a function of anodic treatment in connection with one embodiment of the present invention.
Figure 3B:
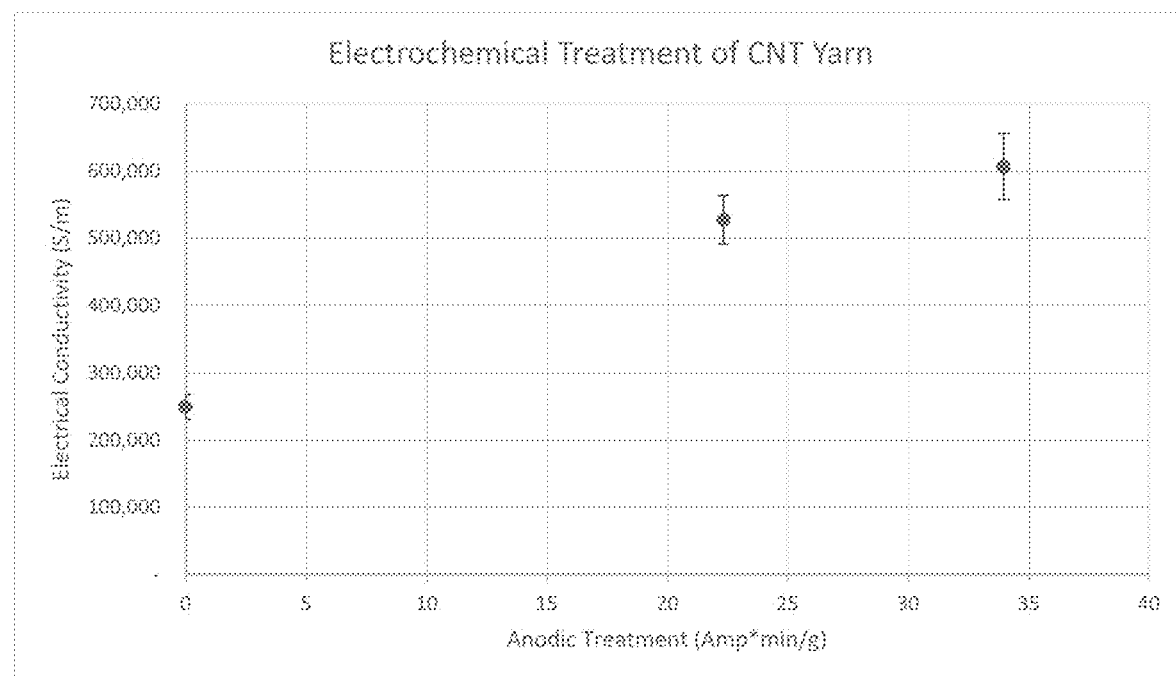
FIG. 3B illustrates the electrical conductivity enhanced with anodic treatment of the carbon nanotube material in connection with one embodiment of the present invention.

In some embodiments, once the electrical charge is allowed to dissipate, and the solvent or solution to evaporate, the aligned material can bundle and densify resulting in a stronger and more electrically conductive material (see FIG. 3B).

Some aspects of the invention relates to a method for doping CNT material to improve electrical conductivity. In some embodiments, the anodic electrochemical treatment allows for the insertion of anions into the CNT material (i.e. electron doping of CNT material). In some embodiments, such anodic electrochemical treatment can enhance electrical conductivity.

In some embodiments, electrostatic exfoliation and stretching can be accomplished with super acids because of extensive protonation. In some embodiments, the anodic electrochemical treatment can be controlled by controlling the electrochemical potential or the duration of the treatment for example.

In some embodiments, the anodic electrochemical treatment may work synergistically with super acids treatment. In some aspects of the invention, a protonation agent can be used as a stretching agent, and allow for the stretching and/or alignment of the CNTs. In particular, superacids, such as chlorosulfonic acid, triflic acid, fluorosulfuric acid and fluoroantimonic acid or a combination thereof can be used. In some embodiments, fuming sulfuric acid can be used. In some embodiments, fuming sulfuric acid and a superacid, such as chlorosulfonic acid, triflic acid, fluorosulfuric acid and fluoroantimonic acid or a combination thereof, can be used. In some embodiments, any agent that has a value of less than −12 on the Hammett acidity function scale ($H_0$) can be used. In some embodiments, any agent that has a value of less than −12.5 on the Hammett acidity function scale ($H_0$) can be used.

In some embodiments, the CNTs material (e.g. yarn, sheet, etc. . . . ) can be drawn through an organic electrolyte solution, and a positive voltage can be applied relative to an electrode in close proximity to the material. In some embodiments, the electrolyte can consist of a polar organic solvent. For example, the organic solvent can be acetonitrile, with ~0.1 M dissolved organic salt, such as tetrabutyl ammonium hexafluorophosphate, tetrabutyl ammonium tetra fluoroborate, tetra butyl ammonium perchlorate, or tetra ethyl ammonium perchlorate or combination thereof. A positive voltage of from about 2 V to about 15 V can be applied relative to a counter electrode. In some embodiments, the CNT material electrochemically is treated with a positive voltage and the resulting treated CNT material is substantially free of contamination or foreign material as shown on scanning electron microscopy (SEM) image. The counter electrode may be copper, or carbon, or some other electrode material known in the art. In some embodiments, a separator can be positioned between the CNT material being treated and the counter electrode. In some embodiments, the separator can be a piece of filter paper, a porous polymer membrane, or some other porous, non-conducting material known in the art. In some embodiments, the degree of treatment can be quantified as the total amps×treatment time per gram of material being treated. In some embodiments, the degree of treatment can be controlled by the interaction length (e.g. distance that the yarn is in close proximity to the counter electrode) and the speed that the yarn passes through the treatment zone, as well as the applied voltage.

According to some embodiments, the iron content of the treated CNT material can be reduced by at least half by the anodic electrochemical treatment. In some embodiments, the anodic electrochemical treatment can result is enhancement of electrical conductivity of the material. In some embodiments, anodic treatment can enhance conductivity of the CNT material by at least a factor of 2, at least a factor of 3, at least a factor of 4, at least a factor of 5, or greater.

In some embodiments, tension can be applied to the material as it is being treated in order to improve CNT alignment in the material, and improve properties in the final result.

In some embodiments, after electrochemical treatment, the material can be washed to remove electrolyte salts, adsorbed impurities, and further dissolve iron. Washing can be accomplished by dipping through various combinations of solutions, which can include, for example, acetonitrile, acetone, citric acid in water, concentrated or dilute hydrochloric acid, other acid in water, and/or pure water. The material can then be dried and used without further processing. Yet in other embodiments, the material can be wet-processed with a cross-linking agent, a binder, or a cross-linking agent and a binder to further enhance the desired properties. In some embodiments, super acids, such as chlorosulfonic acid, can be used before or after electrochemical treatment to further enhance properties.

In some embodiments, after anodic treatment, the material may be treated cathodically (negative voltage relative to the counter electrode) in an electrolyte solution to remove negative ions. The electrolyte solution can be the same or another electrolyte solution. For example, treatment at −1.1 V in aqueous sodium hydroxide solution can drive the phosphate anions that might be left within the material after anodic treatment out of the material, replacing them with hydroxide ions. Subsequent dipping through acidic solution can neutralize the hydroxide ions leaving only water that can be dried out of the material later.

In some embodiments, charging the CNT material to a positive voltage in an organic electrochemical cell can expose and dissolve the iron catalyst particles, clean some or most of the non-CNT carbonaceous impurities from CNT material, exfoliate the CNT bundles allowing for stretching and alignment of the material or any combinations of the foregoing. Such electrochemical treatment can result is enhancement of strength and electrical conductivity of the material.

In some embodiments, the electrochemical treatment can prepare the material for further processing. In some embodiments, the electrochemically treated material can bind better to polymers. One of skill in the art will appreciate that addition of polymers in the conventional technology can adversely affect electrical conductivity and heat conduction. Some embodiments relate to CNTs conductive-polymer composite. In some embodiments, the CNTs are subjected to anodic electrochemical treatment and are subsequently post-processed by addition of polymers to enhance mechanical properties (e.g. strength) while minimizing reduction in electrical conductivity.

In some embodiments, the CNTs are subjected to anodic electrochemical treatment and are subsequently post-processed by solution/acid washing, cathodic treatment, further anodic treatment, incorporation of polymer, or any combination thereof. Washing can be accomplished by dipping through various combinations of solutions, which can include, for example, acetonitrile, acetone, citric acid in water, concentrated or dilute hydrochloric acid, other acid in water, and/or pure water.

Processing of Electrochemically Treated CNTs Material

In accordance with some embodiments of the present invention, prior to stretching, the extensible macrostructure may be exposed to a stretching agent. In some embodiments, the macrostructure can be a sheet, a yarn, buckypaper, etc. . . . . In some embodiments, the stretching agent can be a protonation agent. In some embodiments, the stretching agent can be a super acid. For example, the super acid can be chlorosulfonic acid (CSA), triflic acid, fluorosulfuric acid and fluoroantimonic acid or a combination thereof. In some embodiments, the stretching agent is fuming sulfuric acid. In some embodiments, fuming sulfuric acid and a superacid, such as chlorosulfonic acid, triflic acid, fluorosulfuric acid and fluoroantimonic acid or a combination thereof, can be used.

It should be appreciated that the use of chlorosulfonic acid requires highly specialized operating conditions as chlorosulfonic acid is very reactive to other chemicals (e.g., water). After treatment, the superacids, like chlorosulfonic acid, can be washed away as they may leave a residue and can be incompatible with other components when the processed material is combined in a product formulation.

In some embodiments, the stretching agent can be applied by spray, drip, bath, flood, waterfall or any other appropriate process known in the art. In some embodiments, the super acid is CSA at a concentration of about 30% to about 100%. In some embodiments, the super acid is CSA at a concentration of about 30%, about 40%, about 50%, about 60%, about 70%, about 80%, about 90% or about 100% in a solvent. In some embodiments, the solvent is chloroform, acetone, 1,2 dichloroethane, pyrridine, acetonitrile, carbon tetrachloride, trichloroethylene, tetrachloroethylene. Dilution agent can also be dilute acids such as sulfuric acid, at a concentration from about 10% to about 90%.

In some embodiments, the stretching agent allows for the breaking of the electrostatic bonds that held the material together. In some embodiments, the stretching agent allows for the wetting of the structure, so that sufficient stretching can subsequently be applied to the structure. In some embodiments, the extensible structure can be wetted or immersed in a liquid solution prior to being subjected to stretching. In some embodiments, the extensible structure may be first mounted in the post-processing system, then subsequently sprayed with or immersed in a solution containing super acids until the structure can be sufficiently wetted. In accordance with some embodiments, the extensible structure can remain substantially wet over an appropriate period of time. The period of time can controlled, for example, by the process speed. In some embodiments, whereupon a yarn may be treated, such a yarn may be treated over an appropriate period of time depending on the yarn tex (linear density in grams/kilometer) value. For example, the superacid can be applied for from about 1 s to about 30 s. In some embodiments, the super acid can be applied for from about 1 s to about 5 s, for from about is to about 10 s, for from about 1 s to about 20 s, for from about 5 s to about 10 s, for from about 10 s to about 20 s, for from about 10 s to about 30 s. Super acid can be applied for from about 3 s to about 10 s for yarns of varying tex, such as 10 to 40 tex and for greater lengths of time for strips, sheets and other larger bulk macrostructures.

Once sufficiently wetted, the extensible macrostructure may be subjected to elongation (i.e., stretching) in order to cause the intermingled and substantially non-aligned nanotubes to substantially align along the direction of the stretching. Stretching, in accordance with some embodiments of the present invention, allows the intermingled and substantially non-aligned nanotubes, bundles of nanotubes, and/or ropes of nanotubes within the extensible structure to be pulled into substantial alignment. In addition, stretching may pull adjacent nanotubes into contact with one another, and can enhance and/or increase the points of contact between adjacent nanotubes, bundles of nanotubes, and/or ropes of nanotubes. The enhanced contact between adjacent nanotubes, in some embodiments, can lead to increased conductivity (e.g., electrical and/or thermal), as well as tensile strength of the extensible macrostructure, in comparison to that of an extensible macrostructure with substantially non-aligned nanotubes.

It should be appreciated that the extensible macrostructure may be stretched to permit nanotube alignment using any type of apparatus that produces a local stretching. The stretching, for example, may be done over a large amount of extensible structure material. However, the risk of the material elongating at a weak area or defect, in such an approach, can be higher than if the stretching apparatus were designed to stretch the material incrementally over a relatively smaller length (i.e. local stretching). In some embodiments, the stretching procedure can be incremental over a relatively smaller distance. For example, the rate of elongation can be from about 0.001 percent per minute to about 10 percent per minute. For example, the rate of elongation can be about from about 1 percent per minute (based on 65%*(0.75 m/min)/0.5 m) to about 3 percent per minute. Sufficiently good results can be obtained with the rate of elongation being about 0.3 percent per minute.

In some embodiments, whereupon a yarn may be stretched, such a yarn may be stretched to a point where its tenacity is increased by at least 2 times, at least 3 times, at least 4 times or more the original tenacity of the yarn before treatment. For example, while untreated yarn has a breaking tensile stress value of about 0.5 N/tex, the CSA treated yarn, according to some embodiments, has a breaking tensile stress value of about 1.84 N/tex or about 2 N/tex which correspond to a 3.7 to 4 times improvement. The N/tex unit is the breaking stress or breaking force in Newtons divided by the linear density of the tested material in grams/kilometer).

In some embodiments, whereupon a yarn may be stretched, such a yarn may be treated to a point where its resistivity is decreased by at least 7 times the original resistivity of the yarn before treatment. In some embodiments, improvement is about 5 to about 9 times. For example, a resistivity of about $3 \times 10^{-4}$ $\Omega$-cm can be improved to about $4.25 \; 10^{-5}$ $\Omega$-cm which corresponds to a 7 times improvement.

Upon sufficient stretching, substantial alignment of the nanotubes within extensible structure can be achieved. This alignment, in some embodiments, may be proportional to the degree of stretching, as described above by the change in the resistivity with the degree of stretch, and with the increase in the mechanical properties with the degree of stretch. In addition, stretching may also enhance other properties of the extensible structure. Specifically, contacts between adjacent nanotubes, bundles of nanotubes, and/or ropes of nanotubes, can be enhanced, which can result in increased conductivity (e.g., electrical and/or thermal) as well as tensile strength of the extensible structure.

According to some aspects of the invention, stretching CNT macrostructure or material in the presence of superacids, such as CSA, under tensile load can dramatically improves the tensile strength and electrical conductivity of the material. These property improvements are much greater than those achievable through other treatments known in the art. Without being bound by the theory, it is likely that superacids, such as CSA, can accomplish such improvements on the CNT macro structures through one or more of the following effects:

1. Cleaning the CNTs at the molecular level within the macrostructure by exfoliating or disengaging impurities.
2. Exfoliating/debundling the CNTs within the macrostructure. As used herein, "exfoliation" refers to a the process wherein carbon nanotube agglomerates, bundles, ropes, or aggregates primarily held together by van der Waals forces, are disengaged from each other so that they can move. In some embodiments, the CSA functionalizes the nanotubes and the nanotubes are exfoliated/debundled through protonation and/or sulfonation.
3. Lubricating the CNTs within the macrostructure thereby allowing for further stretching and alignment.
4. Cross-linking the CNTs through the creation of bridging sulfate bonds. Cross-linking can, in some embodiments, enhance load and electron transfer.
5. Densification through evaporation of a very high surface tension liquid.

It should be appreciated that protonation can cause the CNT macrostructure or CNTs to exfoliate and the CNTs or bundles to repel from each other.

In some embodiments, the superacid, such as CSA, can act as a lubricant which can infiltrate between the bundles and allows for the slippage of the bundles between one another while also exfoliating impurities between the bundles and washing them away. In some embodiments, the impurities can be amorphous carbon and/or polyaromatic hydrocarbons.

As tensile forces are applied to the CNT material, the bundles slip past one another. The bundles can then straighten and align. The greater the amount the stretch, the higher the degree of macro/micro scale alignment of nanotube bundles.

It should be appreciated that the CNT macrostructure can only be stretched to a certain limit before voids are produced and where any further stretch is more likely to cause failure of the material structure. Assuming that the standard nanofiber (i.e. bundle) curvature of 180 degrees, the length increase of the structure after stretching the nanofiber straight is:

$$AB(\text{straight})/AB(\text{curve})=L/(2L/\pi)=\pi/2 \text{ or } 1.57 \text{ longer},$$
which is a 57% stretch.

Voids are likely to occur as the stretches are greater than this length of stretch. Accordingly, in some embodiments, stretching of the CNT macrostructure is performed such that no voids are created.

Once the CNT macrostructure has been stretched, the CSA can be neutralized and removed. Once removed, through solvent washes and heating, van der Waals forces take over and the density of the CNT macrostructure increases which has been shown to increase tube to tube interactions. In addition to alignment, the superacids, such as CSA, can functionalize the surface of the CNTs, creating bonding bridges between bundles. The physical/property benefits of stretching CNT macrostructure in superacids, such as CSA, include increased tensile properties (such as modulus, tenacity), improved electrical properties and/or a cleaner functionalized structure that can be ready to form composites.

In general, the acid and impurities can be removed from the exfoliated carbon nanotubes by rinsing with water, organic solvents or combinations thereof. In some embodiments, supercritical fluids such as, for example, highly compressed $CO_2$ or hydrocarbons such as, for example, propane or butane, may also be employed to remove impurities from the exfoliated carbon nanotubes.

In some embodiments, following the elongation or stretching procedure, the extensible macrostructure may be washed in an appropriate solvent. The extensible structure may be washed in 100% solvent. In some embodiments, the solvent can be Chloroform, Dichloromethane, 1,2-Dichloroethane, Acetonitrile, Acetone, Ethanol, water; Carbon Tetrachloride, Tetrachloroethylene, Trichloroethylene or any combination thereof.

Thereafter, the stretched structure may be surface dried in an oven. In some embodiments, the stretched structure may be surface dried in $N_2$ or other dried environment at temperatures that may range between about 150° C. to about 400° C.

The washing and drying procedure can, in some embodiments, be effective in removing the super acids used in the stretching process.

The clean structure can then, in some embodiments, be washed in water. In some embodiments, the structure can be washed or boiled in water for about 1 h, or less, to about 24 h, or more. The structure can then be vacuum oven dried. For example, the structure can be dried at 30 mmHg at about 200° C. for about 1 h, or less, to about 24 h, or more.

It should be understood that methods of the invention are not limited to the post-synthesis processing of yarn and can be applied to the any nanotube macrostructures, such as sheet, film, tape, fibers etc. . . .

Applications

Sheets, yarns, and fibers of carbon nanotubes made from the present invention can have a wide variety of applications, including as an electrical conductor. CNT material produced in accordance with various embodiments of the present invention can be used in batteries and in applications that require exclusion of iron.

In some embodiments, the CNTs material can be used in a wire, an electromagnetic shield, a power delivery cable, etc. In some embodiments, a CNT sheet of the present invention, for example, can be rolled to form the conductor or shield of a coaxial cable. Additionally, CNT sheets can be layered in order to increase the conductive mass of the sheet to allow the sheet to carry more current, to increase strength, and/or thermal conductivity for better ampacity. Similarly, CNT yarns can be used to form cable elements, such as conductive elements of coaxial cables, twisted pair cables, etc. The CNT yarns can be twisted or bundled into a larger yarn to increase the amount of conductive mass in the yarn and allow the yarn to carry more current. CNT material of the present invention can also be used to make electrical connections on circuit boards, such as printed circuit boards (PCB), etc.

Examples of specific applications of the CNT material of the present invention can also include electromagnetic interference shielding (EMI shielding) which may reflect or absorb EMI radiation and thereby provide electrical shielding. Shielding may be beneficial to prevent interference from surrounding equipment and may be found in stereo systems, telephones, mobile phones, televisions, medical devices, computers, and many other appliances. Shielding may also be beneficial to reduce electromagnetic emissions that radiate from electronic devices. Reducing such radiated emissions can help the electronic device meet regulatory EMC requirements. The conductive layer may also be used as a ground plane or power plane, and may provide a means of creating an electromagnetic mirror.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Examples

Electrochemical Treatment of CNT Yarn and Sheet Materials

CNT yarn material was drawn through an organic electrolyte solution, and a positive voltage was applied relative to an electrode in close proximity to the material. The electrolyte consists of a polar organic solvent such as acetonitrile, with ~0.1 M dissolved organic salt, such as tetrabutyl ammonium hexafluorophosphate, tetrabutyl ammonium tetra fluoroborate, tetra butyl ammonium perchlorate, or tetra ethyl ammonium perchlorate. A positive voltage of ~2 V to 15 V was applied relative to a counter electrode. The counter electrode may be copper, or carbon, or some other electrode material.

The degree of treatment was quantified as the total amps×treatment time per gram of material being treated, and was controlled by the interaction length (distance that the yarn is in close proximity to the counter electrode) and the speed that the yarn passes through the treatment zone, as well as the applied voltage.

Figure 2:
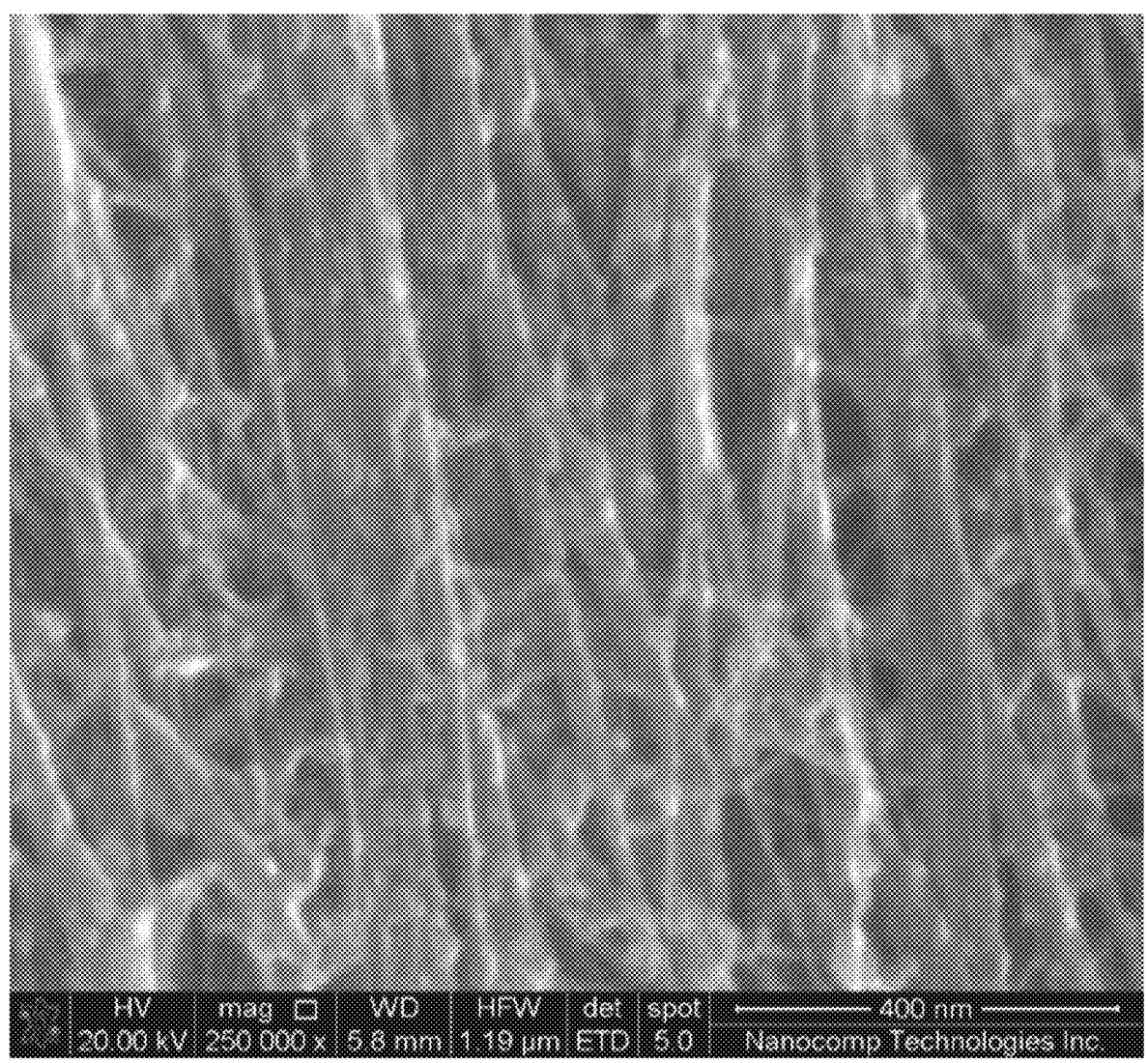
FIG. 2A illustrates a SEM of a carbon nanotube material treated electrochemically using a negative potential.
FIG. 2B illustrates a SEM of a carbon nanotube material treated electrochemically using a positive potential.
FIG. 2C illustrates a TGA plot of a carbon nanotube material treated electrochemically using a negative potential.
FIG. 2D illustrates a TGA plot of a carbon nanotube material treated electrochemically using a positive potential.
Figure 2B:
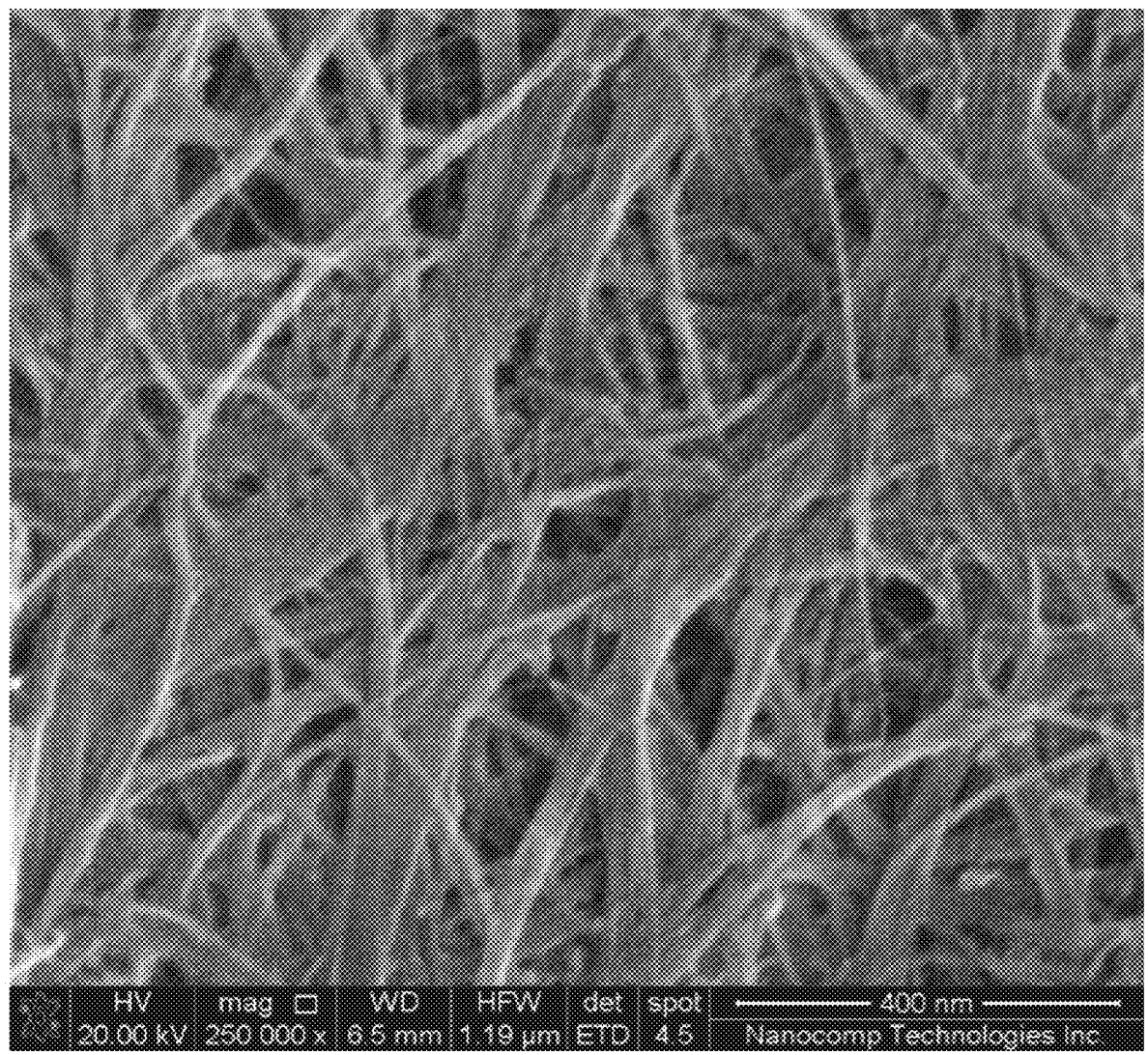
Figure 2C:
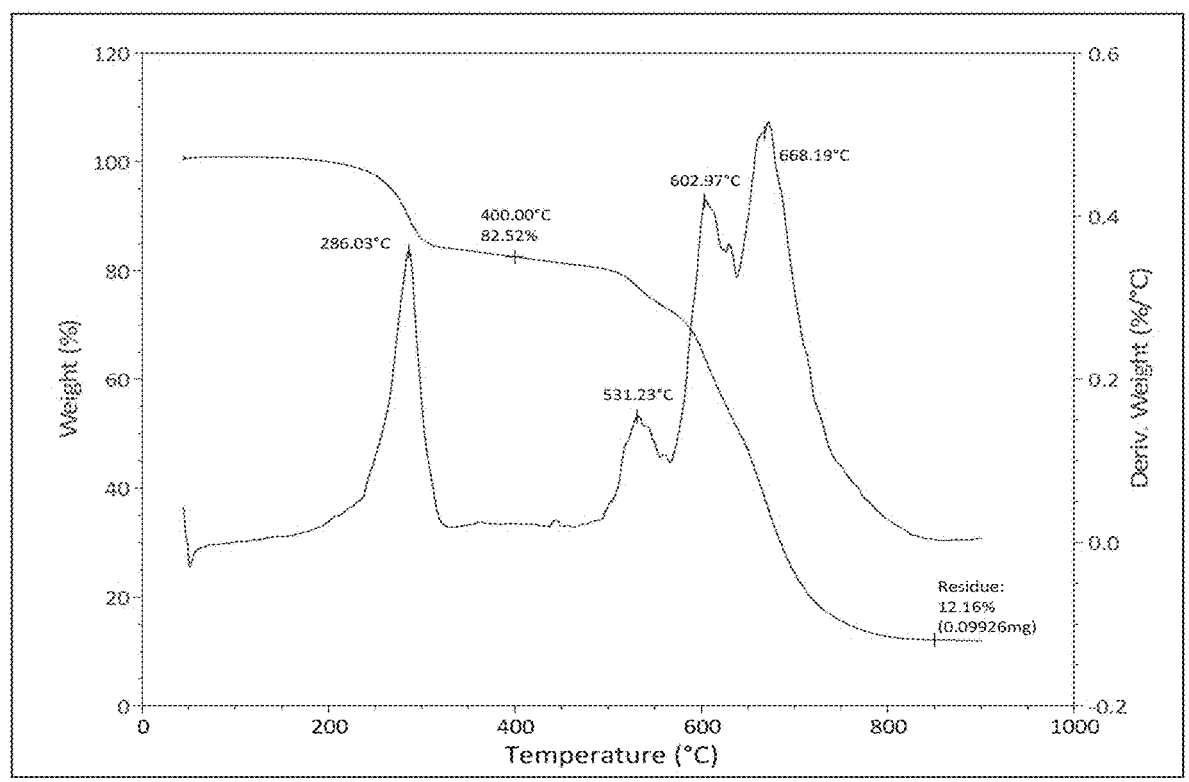
Figure 2D:
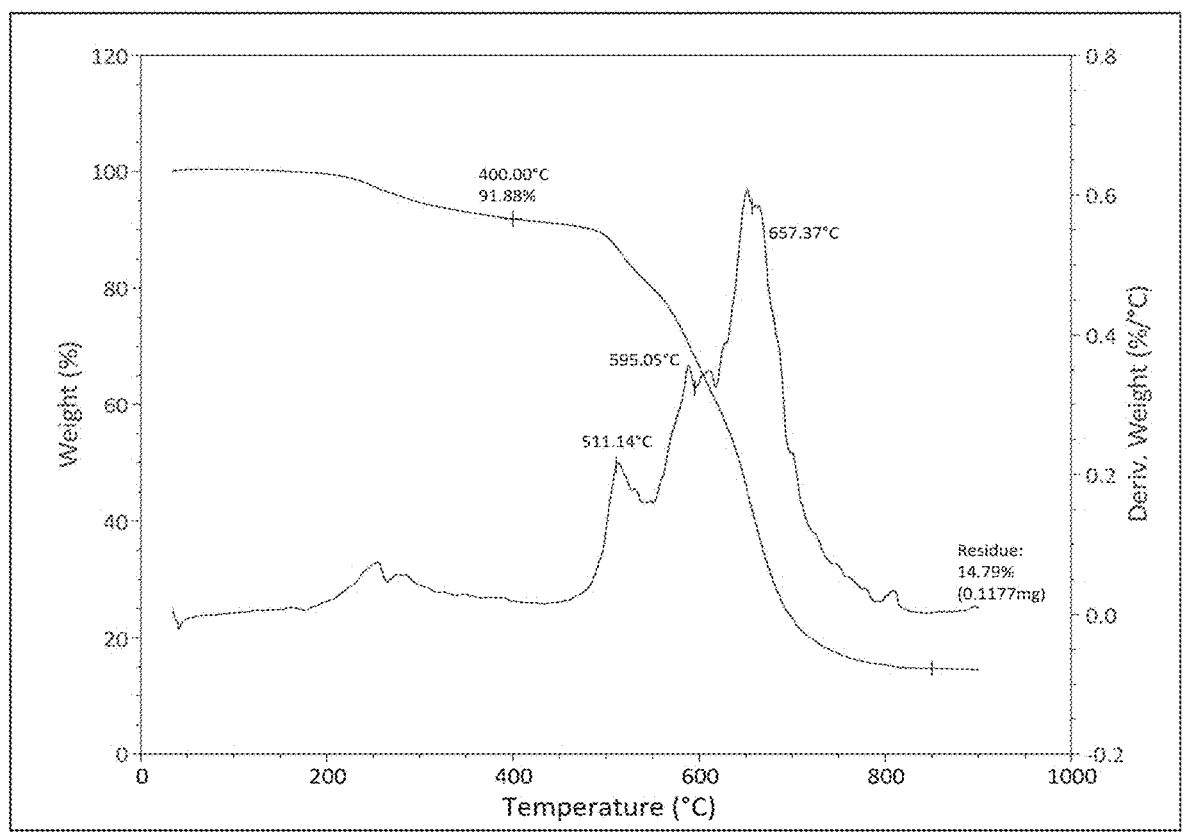

FIG. 2A shows a scanning electron microscopy (SEM) image of CNT material treated electrochemically for one minute at −2.4 V, showing a coating of contamination on the nanotubes. In contrast, FIG. 2B shows an SEM of CNT material treated electrochemically for one minute at +2.4 V according to the methods described herein, showing nanotubes free of visible foreign material. The CNT material was subjected to thermogravimetric analysis (TGA) to determine the mass change of the material as a function of the temperature. Referring to FIG. 2C, the TGA plot of CNT material treated at −2.4 V shows a large peak at 287° C. corresponding to contaminants. In contrast, referring to FIG. 2D, the TGA plot of CNT material treated at +2.4 V shows a dramatic reduction in the peak associated with contaminants.

Referring to FIG. 3A, the iron content by Energy Dispersive X-Ray (EDX) relative to carbon content in weight percent is shown as a function of anodic treatment. Anodic treatment reduces iron content from an iron content of more than 11% by weight to an iron conetnt of less than 4% by weight in the CNT yarn. No hydrocarbon weight was observed. According to some embodiments, the iron content of the treated CNT material can be reduced by at least half by the anodic electrochemical treatment. FIG. 3B shows a plot of the electrical conductivity of a yarn (in S/m) prior and after anodic treatment.

There may be a separator between the yarn being treated and the counter electrode, consisting of a piece of filter paper, or porous polymer membrane, or some other porous, non-conducting material.

It should be appreciated that tension can be applied to the material as it is being treated in order to improve CNT alignment in the material, and improve properties in the final result.

After electrochemical treatment, the material can be washed to remove electrolyte salts, adsorbed impurities, and further dissolve iron. This can be accomplished by dipping through various combinations of solutions, which might include: acetonitrile, acetone, citric acid in water, concentrated or dilute hydrochloric acid, other acid in water, and/or pure water. The material can then be dried and used without further processing, or it can be wet-processed with a cross-linking agent and/or binder to further enhance the desired properties. CSA can be used before or after electrochemical treatment to further enhance properties.

After anodic treatment the material may be treated cathodically (negative voltage relative to the counter electrode) in fresh, and perhaps different, electrolyte solution to remove negative ion. For example, treatment at −1.1 V in aqueous sodium hydroxide solution would drive the phosphate anions that might be left in the material after anodic treatment out of the material, replacing them with hydroxide ions. Subsequent dipping through acidic solution would neutralize the hydroxide ions leaving only water that can be dried out of the material later.

It should be appreciated that sheet CNT material can also be treated in a similar fashion.

INCORPORATION BY REFERENCE

Reference is made to U.S. Pat. No. 7,993,620 which is hereby incorporated by reference in its entirety All publications, patent applications and patents mentioned herein are hereby incorporated by reference in their entirety as if each individual publication or patent was specifically and individually indicated to be incorporated by reference.

What is claimed is:

1. A method for treating a nanofibrous macrostructure, the method comprising:
    (a) providing a nanofibrous macrostructure, the nanofibrous macrostructure being defined by a plurality of substantially non-aligned nanotubes;
    (b) exposing the nanotubes within the nanofibrous macrostructure to a first electrochemical treatment to form an electrochemically treated nanofibrous macrostructure, wherein the first electrochemical treatment is an anodic treatment comprising contacting the nanofibrous macrostructure with a first electrolyte solution and subjecting the nanofibrous macrostructure to electrical energy in a range from 20 to 100 Amperes-minute per gram of the nanofibrous macrostructure and stretching the nanofibrous macrostructure while exposing the nanotubes to the first treatment
    wherein the nanofibrous macrostructure is not heated to a temperature in a range from 300 to 800° C. prior to exposing the nanotubes within the nanofibrous macrostructure to the first electrochemical treatment; and
    (c) exposing the electrochemically treated nanofibrous macrostructure to a second electrochemical treatment which is a cathodic treatment by contacting the electrochemically treated nanofibrous macrostructure with a second electrolyte solution and subjecting the electrochemically treated nanofibrous macrostructure to electrical energy.

2. The method of claim 1, wherein the step of stretching the nanofibrous macrostructure substantially aligns the nanotubes relative to one another within the stretched nanofibrous macrostructure.

3. The method of claim 1, wherein, in the step of providing, the nanofibrous macrostructure is a non-woven sheet of nanotubes.

4. The method of claim 1, wherein, in the step of providing, the nanofibrous macrostructure is a yarn.

5. The method of claim 1, wherein the step of providing, the nanotubes are carbon nanotubes.

6. The method of claim 1, wherein, in the step of providing, the nanotubes include one of single wall nanotubes, dual wall nanotubes, multiwall nanotubes, or a combination thereof.

7. The method of claim 1 wherein the step of exposing is in an electrochemical cell.

8. The method of claim 1 wherein the first electrolyte solution is an organic electrolyte solution.

9. The method of claim 1 further comprising washing the nanofibrous macrostructure.

10. The method of claim 1 wherein the impurities comprise non-CNT carbonaceous contaminant, hydrocarbon, catalyst, and combination thereof.

11. The method of claim 10 wherein the catalyst is iron.

12. The method of claim 1 further comprising collecting the electrochemically treated and stretched nanofibrous macrostructure.

13. The method of claim 1 wherein the second electrochemical treatment comprises subjecting the nanofibrous macrostructure to electrical energy in a range from 20 to 400 Amperes-minute per gram of the nanofibrous macrostructure.

14. The method of claim 1, further comprising exposing the nanofibrous structure to an acid having an $H_0$ value of less than −12, and optionally subjecting the nanofibrous structure to additional stretching.

15. The method of claim 1 wherein the acid is a super acid and comprises one of chlorosulfonic acid, triflic acid, fluorosulfuric acid, fluoroantimonic acid, fuming sulfuric acid or a combination thereof.

* * * * *